US011831783B2

(12) United States Patent
Colacitti et al.

(10) Patent No.: US 11,831,783 B2
(45) Date of Patent: *Nov. 28, 2023

(54) SYSTEM AND METHOD FOR SECURE COMMUNICATION WITH ONE OR MORE UNMANNED AERIAL VEHICLES

(71) Applicant: Drone Delivery Canada Corp., Vaughan (CA)

(72) Inventors: Gregory Colacitti, Vaughan (CA); Paul Di Benedetto, Vaughan (CA); Mike J. Fattori, Toronto (CA); Ruven Shapiro, Toronto (CA)

(73) Assignee: Drone Delivery Canada Corp., Vaughan (CA)

( * ) Notice: Subject to any disclaimer, the term of this patent is extended or adjusted under 35 U.S.C. 154(b) by 147 days.

This patent is subject to a terminal disclaimer.

(21) Appl. No.: 17/557,796

(22) Filed: Dec. 21, 2021

(65) Prior Publication Data
US 2022/0173908 A1   Jun. 2, 2022

Related U.S. Application Data

(63) Continuation of application No. 16/186,891, filed on Nov. 12, 2018, now Pat. No. 11,245,533.

(51) Int. Cl.
*H04L 9/32* (2006.01)
*H04L 9/06* (2006.01)
(Continued)

(52) U.S. Cl.
CPC .......... *H04L 9/3242* (2013.01); *H04L 9/0643* (2013.01); *H04L 9/0861* (2013.01);
(Continued)

(58) Field of Classification Search
CPC ... H04L 9/3242; H04L 9/0643; H04L 9/0861; H04L 2209/84; H04W 12/50; H04W 12/069; H04W 12/106
See application file for complete search history.

(56) References Cited

U.S. PATENT DOCUMENTS 7,584,071 B2   9/2009 Lee
8,106,748 B2   1/2012 Lee
(Continued)

FOREIGN PATENT DOCUMENTS

DE   102014105583 A1   10/2015
DE   102014213023 A1   1/2016
(Continued)

OTHER PUBLICATIONS

D. He, S. Chan and M. Guizani, "Communication Security of Unmanned Aerial Vehicles," in IEEE Wireless Communications, vol. 24, No. 4, pp. 134-139, Aug. 2017. (Year: 2017).*
(Continued)

*Primary Examiner* — Michael R Vaughan
(74) *Attorney, Agent, or Firm* — BERESKIN & PARR LLP/S.E.N.C.R.L., s.r.l.

(57) ABSTRACT

Various embodiments of a system and method for secure, authenticated communication with one or more unmanned aerial vehicles (UAVs) are described herein. The system includes at least one computing system which is operable with instructions to: receive, from an unmanned aerial vehicle of one or more unmanned vehicles, a message; extract, from the message, an unmanned aerial vehicle serial number and a secret key; compute a hash of the secret key to generate a first hashed secret key; retrieve, from an internal database located on a non-transient memory of the at least one computing system, a second hashed secret key associated with the unmanned aerial vehicle serial number; and compare the first hashed secret key with the second hashed secret key to determine whether the message is valid.

19 Claims, 19 Drawing Sheets

(51) Int. Cl.
*H04L 9/08* (2006.01)
*H04W 12/50* (2021.01)
*H04W 12/069* (2021.01)
*H04W 12/106* (2021.01)

(52) U.S. Cl.
CPC ....... *H04W 12/069* (2021.01); *H04W 12/106* (2021.01); *H04W 12/50* (2021.01)

(56) References Cited

U.S. PATENT DOCUMENTS

| | | |
|---|---|---|
| 8,948,935 B1 | 2/2015 | Peeters et al. |
| 9,051,043 B1 | 6/2015 | Peeters et al. |
| 9,056,676 B1 | 6/2015 | Wang |
| 9,120,568 B2 | 9/2015 | Herman et al. |
| 9,174,733 B1 | 11/2015 | Burgess et al. |
| 9,244,147 B1 | 1/2016 | Soundararajan et al. |
| 9,302,783 B2 | 4/2016 | Wang |
| 9,305,280 B1 | 4/2016 | Berg et al. |
| 9,334,052 B2 | 5/2016 | Pasko et al. |
| 9,384,668 B2 | 7/2016 | Raptopoulos et al. |
| 9,387,928 B1 | 7/2016 | Gentry et al. |
| 9,429,953 B1 | 8/2016 | Miller et al. |
| 9,459,620 B1 | 10/2016 | Schaffalitzky |
| 9,527,605 B1 | 12/2016 | Gentry et al. |
| 9,573,684 B2 | 2/2017 | Kimchi et al. |
| 9,536,216 B1 | 3/2017 | Isso |
| 2005/0154653 A1 | 7/2005 | Jongebloed |
| 2011/0264311 A1 | 10/2011 | Lee et al. |
| 2012/0143482 A1 | 6/2012 | Goossen et al. |
| 2013/0185548 A1 | 7/2013 | Djabarov et al. |
| 2013/0332008 A1 | 12/2013 | Herman et al. |
| 2014/0032034 A1 | 1/2014 | Raptopoulos et al. |
| 2015/0120094 A1 | 4/2015 | Kimchi et al. |
| 2015/0158587 A1 | 6/2015 | Patrick et al. |
| 2015/0317597 A1 | 11/2015 | Shucker et al. |
| 2015/0339933 A1 | 11/2015 | Batla et al. |
| 2015/0336669 A1 | 12/2015 | Kantor et al. |
| 2015/0353195 A1 | 12/2015 | Peeters et al. |
| 2015/0370251 A1 | 12/2015 | Siegel et al. |
| 2015/0379874 A1 | 12/2015 | Ubhi et al. |
| 2016/0001883 A1 | 1/2016 | Sanz et al. |
| 2016/0016664 A1 | 1/2016 | Basuni |
| 2016/0033966 A1 | 2/2016 | Farris et al. |
| 2016/0163204 A1 | 6/2016 | Raptopoulos et al. |
| 2016/0189101 A1 | 6/2016 | Kantor et al. |
| 2016/0200438 A1 | 7/2016 | Bokeno et al. |
| 2016/0239803 A1 | 8/2016 | Borley et al. |
| 2016/0284221 A1 | 9/2016 | Hinkle et al. |
| 2017/0012949 A1 | 1/2017 | Boren et al. |
| 2018/0198779 A1 | 7/2018 | Canavor et al. |
| 2019/0065747 A1 | 2/2019 | Gomes de Oliveira et al. |
| 2019/0087576 A1 | 3/2019 | Olson |
| 2019/0333395 A1 | 10/2019 | Borshchova et al. |
| 2020/0162434 A1 | 5/2020 | Tang et al. |
| 2020/0213116 A1 | 7/2020 | Fattal et al. |

FOREIGN PATENT DOCUMENTS

| | | |
|---|---|---|
| EP | 3198581 B1 | 12/2019 |
| WO | 2015061008 A1 | 4/2015 |
| WO | 2015175242 A1 | 11/2015 |
| WO | 2015168573 A1 | 2/2016 |
| WO | 2016019242 A1 | 2/2016 |
| WO | 2016037219 A1 | 3/2016 |
| WO | 2016094067 A1 | 6/2016 |

OTHER PUBLICATIONS

DRONENET The next BIG thing: Global Guerrillas, Wednesday, Jan. 2, 2013.

* cited by examiner

FIG. 5A

| | | |
|---|---|---|
| UAV Controller Serial #: | 5541562D31323334353637 38 | //UAV-12345678 in ascii hex |
| Message ID: | 00 | // routine polling request |
| Message Counter: | 109C | // 4,252 Flight counter sent in last msg |
| Payload Length: | 00000000 | // indicates no payload |
| Payload: | | // no payload |
| Payload CRC: | | // no CRC |
| MAC: | D21933303 1144C969A7A941129BCEEAF | //Secret Key GUID |

FIG. 5B

| | | |
|---|---|---|
| Message ID: | 20 | // Load route data |
| Message counter: | 109D | // Flight system increments counter to 4,253 |
| Payload length: | 550D0000 | // 3413 bytes |
| Payload: | 1F8B08.......0000 | |
| Payload hash: | 8F407EEEDC1E45345595400CFF401D18 | //MD5 hash of payload string |

FIG. 5C

| | | |
|---|---|---|
| Controller Serial #: | 5541562D31323334353637 38 | //UAV-12345678 in ascii hex |
| Message ID: | 20 | // Load route data |
| Message counter: | 109D | // 4,253 Flight counter |
| Payload length: | 04000000 | // 4 bytes |
| Payload: | AAAAAAAA | // hash OK |
| Payload CRC: | 5EE096B5 | //CRC32 hash of payload |
| MAC: | D21933303 1144C969A7A941129BCEEAF | //Secret key GUID |

| | | | |
|---|---|---|---|
| 402b → | UAV Controller Serial #: | 5541562D3132333435363738 | //UAV-12345678 in ascii hex |
| 404b → | Message ID: | 00 | // routine polling request |
| 406b → | Message Counter: | 172D | // Flight system counter at 5933 |
| 408b → | Payload Length: | 00000000 | // indicates no payload |
| 410b → | Payload: | | // no payload |
| 412b → | Payload CRC: | | // no CRC |
| 414b → | MAC: | D21933303144C969A7A941129BCEEAF | //Secret Key GUID |

| | | | |
|---|---|---|---|
| 404a → | Message ID: | 22 | // Start fly file pattern |
| 406a → | Message counter: | 172E | // Flight system increments counter to 5934 |
| 408a → | Payload length: | 11000000 | // 17 Bytes |
| 410a → | Payload: | 6D70537461727450061747465726E7C3135 | // mpStartPattern|15 (ASCII encoded) |
| 412a → | Payload hash: | C5A5BCE1C39ECCCA673937E894F0B0D8 | //MD5 hash of payload string |

| | | | |
|---|---|---|---|
| 402b → | UAV Controller Serial #: | 5541562D3132333435363738 | //UAV-12345678 in ascii hex |
| 404b → | Message ID: | 22 | // Start fly file pattern |
| 406b → | Message Counter: | 172E | // Flight system counter at 5934 |
| 408b → | Payload Length: | 04000000 | // payload size |
| 410b → | Payload: | AAAAAAAA | // successful reciept |
| 412b → | Payload CRC: | | // no CRC |
| 414b → | MAC: | D21933303144C969A7A941129BCEEAF | //Secret Key GUID |

| | | |
|---|---|---|
| 402b → | UAV Controller Serial #: | 5541562D31323334353637 38 | //UAV-12345678 in ascii hex |
| 404b → | Message ID: | 00 | // routine polling request |
| 406b → | Message Counter: | 66C1 | // Flight system counter at 26305 |
| 408b → | Payload Length: | 00000000 | // indicates no payload |
| 410b → | Payload: | | // no payload |
| 412b → | Payload CRC: | | // no CRC |
| 414b → | MAC: | D2193330311 44C969A7A941129BCEEAF | //Secret Key GUID |

| | | |
|---|---|---|
| 404a → | Msg ID: | 40 | // Get field value |
| 406a → | Msg counter: | C266 | // Flyte counter at 26306 |
| 408a → | Payload length: | 0E000000 | // 14 Bytes |
| 410a → | Payload: | 6D70526561645661727C31393337 | // mpReadVar|1937 (ASCII encoded) |
| 412a → | Payload hash: | 8E1D739533EED931BCA66D113F0C3F70 | // MD5 hash of payload string |

| | | |
|---|---|---|
| 402b → | UAV Controller Serial #: | 5541562D31323334353637 38 | //UAV-12345678 in ascii hex |
| 404b → | Message ID: | 40 | // Gte field value |
| 406b → | Message Counter: | 66C2 | // Flight system counter at 26305 |
| 408b → | Payload Length: | 10000000 | // Payload length |
| 410b → | Payload: | 6D705265616456617 27C313933377C30 | // ASCII encoded "mpReadVar|1937|0" |
| 412b → | Payload CRC: | 2E1EFE63 | // CRC |
| 414b → | MAC: | D2193330311 44C969A7A941129BCEEAF | //Secret Key GUID |

SYSTEM AND METHOD FOR SECURE COMMUNICATION WITH ONE OR MORE UNMANNED AERIAL VEHICLES

CROSS-REFERENCE TO RELATED APPLICATIONS

This application is a continuation of U.S. patent application Ser. No. 16/186,891, filed Nov. 12, 2018, the entire contents of which is hereby incorporated by reference.

FIELD

The described embodiments relate to unmanned aerial vehicles and, in particular, to a system and method for secure communication with one or more unmanned aerial vehicles.

INTRODUCTION

Unmanned aerial vehicles (UAVs) are being used increasingly for a variety of applications, including, inter alia, for the delivery of articles, parcels, and packages between various parties. In many cases, the in-flight operation of UAVs is controlled through a remote computing system. To this end, the remote computing system may transmit commands, and receive information, from one or more UAVs. An obstacle exists in ensuring that communication between the remote computing system, and the one or more UAVs, occurs in a secure and authenticated manner.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, there is provided a system for secure communication with one or more unmanned aerial vehicles, the system comprising: a controller located on an unmanned aerial vehicle (UAV) of the one or more unmanned aerial vehicles, wherein the controller comprises a processor, and a communication module configured to receive and transmit data over a communication network; an autopilot in data communication with the controller, wherein the autopilot is also located on the UAV and is configured to control the UAV; and a flight management system including at least one computing system having a non-transient memory with executable instructions, wherein the flight management system is in data communication with the controller over the communication network.

In some embodiments, the at least one computing system is operable with said executable instructions to: receive over the communication network a message generated by the controller of the UAV; extract, from the message, an unmanned aerial vehicle serial number and a secret key; compute a hash of the secret key to generate a first hashed secret key; retrieve, from an internal database located on the non-transient memory, a second hashed secret key associated with the unmanned aerial vehicle serial number; compare the first hashed secret key with the second hashed secret key, wherein the message is determined to be valid if the first hashed secret key agrees with the second hashed secret key.

In some embodiments, the message is a hypertext transfer protocol (HTTP) POST message which is transmitted over an HTTP secure channel.

In some embodiments, the message is a polling request configured to initiate communication between the UAV and the at least one computing system.

In some embodiments, after determining the message to be valid, the computing system is further operable with said instructions to transmit to the controller of the UAV, via the communication network, a first response poll message.

In some embodiments, the first response poll message comprises one of a command message, an information request message, and an acknowledgment message.

In some embodiments, the first response poll message is a command message, wherein the command message comprises: a payload field defined by an encoded command; and a hash field defined by a first hash of the encoded command.

In some embodiments, after receiving the first response poll message, the processor of the controller system is configured to: generate a second hash of the encoded command in the payload field; compare the second hash with the first hash of the encoded command; and based on the compare, transmit to the at least one computing system a second response poll message indicating whether the first hash agrees with the second hash.

In some embodiments, the first response poll message is an information request message, and wherein after receiving the first response poll message, the processor for the controller system is configured to: generate a second response poll message, wherein the second response poll message includes the requested information; and transmit the second response poll message to the at least one computing system.

In some embodiments, the message comprises an alert message, and wherein the alert message indicates at least one of a failed command execution by the autopilot and a status change in the autopilot.

In some embodiments, the message comprises a heartbeat message, wherein the heartbeat message includes information retrieved from at least one of the autopilot and the controller.

In some embodiments, the message is a short message service (SMS) message.

In some embodiments, the hashing employs an SHA256 hash method.

In some embodiments, the at least one computing system is operable with said executable instructions to: receive, over the communication network, a key request message generated by the controller located on the unmanned aerial vehicle (UAV); generate an encryption key and a session identification number in response to the key request message; transmit the encryption key and the session identification number to the controller; receive, from the controller, an encrypted heartbeat message which includes an initialization vector and the session identification number; and de-crypt the encrypted heartbeat message using the initialization vector, the encryption key and the session identification number.

In some embodiments, the controller located on the unmanned aerial vehicle (UAV) is configured to: transmit to the flight management system a key request message; receive from the flight management system an encryption key and a session identification number; using the encryption key, encrypt a heartbeat message to generate an encrypted heartbeat message; attach the session identification number to the encrypted heartbeat message; and transmit the encrypted heartbeat message to the flight management system.

In some embodiments, the controller is further configured to compress the heartbeat message.

In some embodiments, encryption key is an AES-256-encryption key.

In some embodiments, the controller is further configured to: generate an initialization vector; and attach the initialization vector to the encrypted heartbeat message.

In some embodiments, the encoded command includes a command for one of loading UAV route data and modifying UAV route data.

In accordance with one aspect of this disclosure, which may be used alone or in combination with any other aspect, there is provided a method for secure communication with one or more unmanned aerial vehicles, the method comprising: receive, from an unmanned aerial vehicle (UAV) of the one or more unmanned vehicles, a message; extract, from the message, an unmanned aerial vehicle serial number and a secret key; compute a hash of the secret key to generate a first hashed secret key; retrieve, from an internal database located on the non-transient memory, a second hashed secret key associated with the unmanned aerial vehicle serial number; compare the first hashed secret key with the second hashed secret key, wherein the message is determined to be valid if the first hashed secret key agrees with the second hashed secret key.

In some embodiments, the message from the UAV is generated by a controller of the UAV.

In accordance with one aspect of this disclosure, which may be used alone or in combination with any other aspect, there is provided a controller, for mounting in a UAV to control operation of an autopilot mounted in the UAV, the controller comprising: a processor; a communications module, for communication with a flight management system; executable instructions for communicating with the autopilot.

In some embodiments, the controller further comprises a modem for cellular, very high frequency (VHF), ultra-high frequency (UHF), or satellite communication with the flight management system.

In some embodiments, the controller further comprises at least one of a polling system, a heartbeat module, an alert module, a compression module, a log-shipping module, and a key-request and encryption module.

In some embodiments, the controller further comprises additional executable instructions that extend the function of the autopilot.

In some embodiments, the controller further comprises general-purpose input and output ports, for communication with devices of the UAV not controlled and/or not in communication with the autopilot.

In some embodiments, the controller further comprises: a serial link between the controller and the autopilot.

It will be appreciated by a person skilled in the art that a system or method disclosed herein may embody any one or more of the features contained herein and that the features may be used in any particular combination or sub-combination.

These and other aspects and features of various embodiments will be described in greater detail below.

DRAWINGS

A preferred embodiment of the present invention will now be described in detail with reference to the drawings, in which:

FIGS. 5A to 5D are example message which may be transmitted between the UAV controller and the flight management system in a polling transaction, according to some embodiments;

FIGS. 6A to 6C are example message which may be transmitted between the UAV controller and the flight management system in a polling transaction, according to other embodiments;

FIGS. 7A to 7C are example message which may be transmitted between the UAV controller and the flight management system in a polling transaction, according to still other embodiments;

DESCRIPTION OF VARIOUS EMBODIMENTS

Figure 1A:
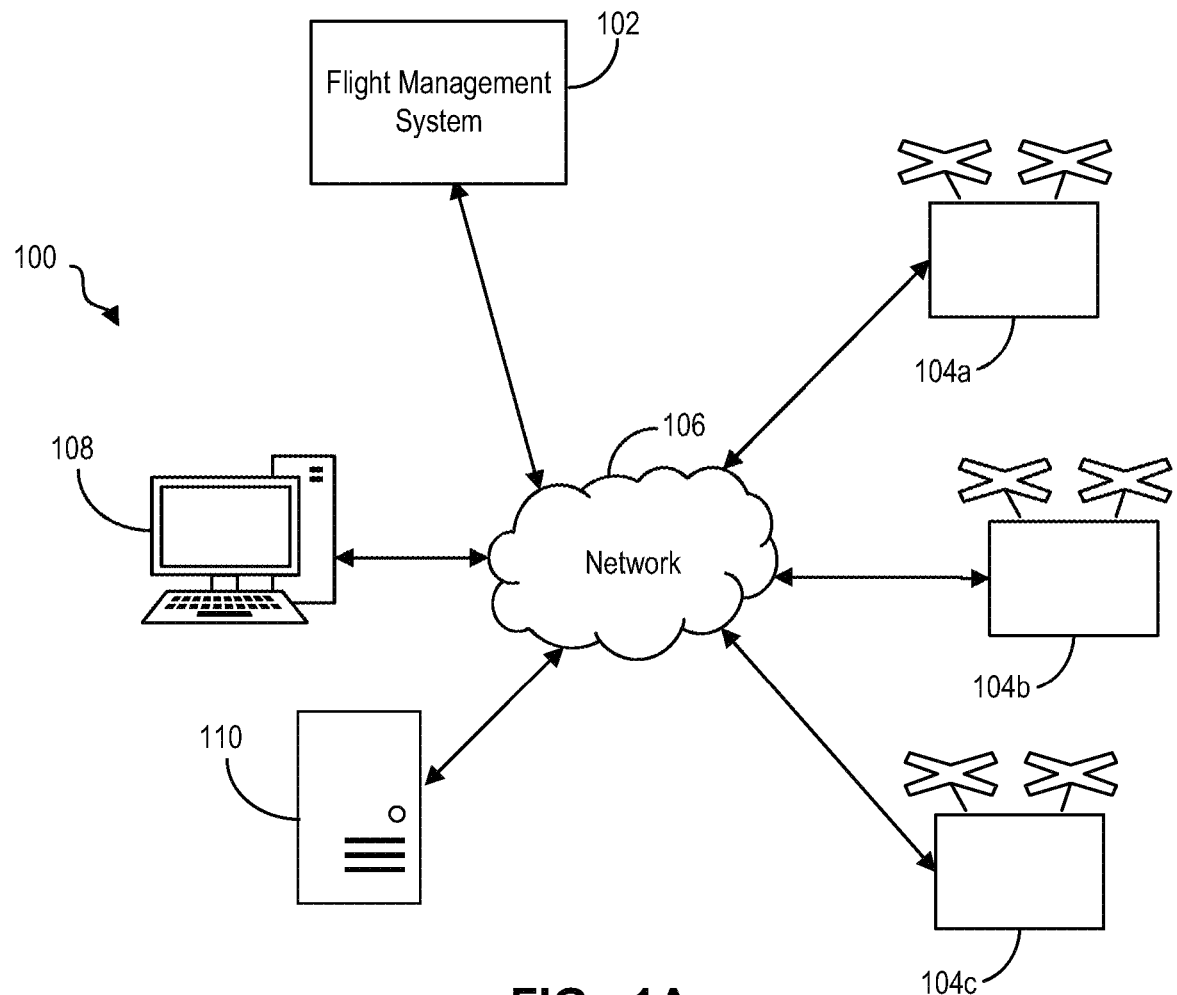
FIG. 1A is a simplified schematic diagram of a system for secure communication between a flight management system and one or more UAVs.

Various systems, apparatuses or methods will be described below to provide an example of an embodiment of each claimed invention. No embodiment described below limits any claimed invention and any claimed invention may cover apparatuses and methods that differ from those described below. The claimed inventions are not limited to systems, apparatuses and methods having all of the features of any one apparatus or method described below, or to features common to multiple or all of the systems, apparatuses or methods described below. It is possible that a system, apparatus or method described below is not an embodiment of any claimed invention. Any invention disclosed in a system, apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

In many cases, unmanned aerial vehicles (UAVs) are remotely controlled by a UAV operator positioned at, for example, a remote computing device. The UAV operator is able to transmit commands in respect of the operation of the UAVs, as well as receive information therefrom. In many cases, the operator does not effect real time control of the UAV; rather the operator provides the UAV with instructions for a particular flight path, that the UAV then follows autonomously. An obstacle exists in ensuring that communication between the UAV operator and the UAVs occurs in a secure manner.

Provided herein is a system and method for secure communication between a remote computing device and one or more unmanned aerial vehicles, and a controller for use in the system and method.

In particular, and as described in further detail herein, secure communication is effected by configuring the UAVs to accept only solicited communication or messages. This feature helps to prevent unauthorized access, or unauthorized attacks by third parties on the UAVs (e.g., denial-of-service (DoS) attacks). As also described herein, secure communication is also achieved by using Transport Layer Security (TLS) protocol for communications between the UAVs and the remoting computing device. In particular, TLS protocol can secure communications by preventing man-in-the-middle attacks. In various embodiments, the secure communication is used to transmit or modify route information from a flight management system to one or more UAVs.

Referring now to FIG. 1A, there is shown is a simplified schematic diagram of a system 100 for secure communication between one or more UAVs 104a, 104b, and 104c, in accordance with at least some embodiments. The system 100 provides the environment in which the methods described herein generally operate. Effected As shown, the system 100 includes a flight management system 102 which is in data communication with the one or more UAVs 104a, 104b, and 104c. The communication between the flight management system 102 and the UAVs 104a to 104c may occur over a communication network 106. Communication network 106 may be, for example, one or more of a wireless personal area network such as a Bluetooth™ network, a wireless local area network such as the IEEE 802.11 family of networks, a cellular communication network, Ethernet or a satellite communication network.

In various embodiments, the UAVs 104a to 104c may be used for delivery of articles, parcels, or packages between various locations, or between various parties.

Further, while only three UAVs are illustrated in the system 100, in other cases, the system 100 may include any number of UAVs.

Generally, the flight management system 102 may be configured to control the operation of one or more of UAVs 104a to 104c. For example, the flight management system 102 may be configured to send commands (i.e., including route information), via communication network 106, to the UAVs 104a to 104c. The flight management system 102 may be configured to request and receive information from the UAVs 104a to 104c. The information may be in respect of the status and location of a particular UAV. The flight management system 102 may be configured to receive "alert" messages from UAVs 104a to 104c due to unexpected or spontaneous events.

The system 100 may also include a computing device 108 and an external server 110. In some cases, the computing device 108 may be operated by, for example, by the UAV operator.

In examples provided herein, the flight management system 102 may be provided, and otherwise operable, on the computing device 108. In other embodiments, the flight management system 102 may be located (or hosted) on the external server 110. In these cases, the communication network 106 can include a wired component which allows for the option of wired communication between the computing device 108 and the external server 110.

Figure 1B:
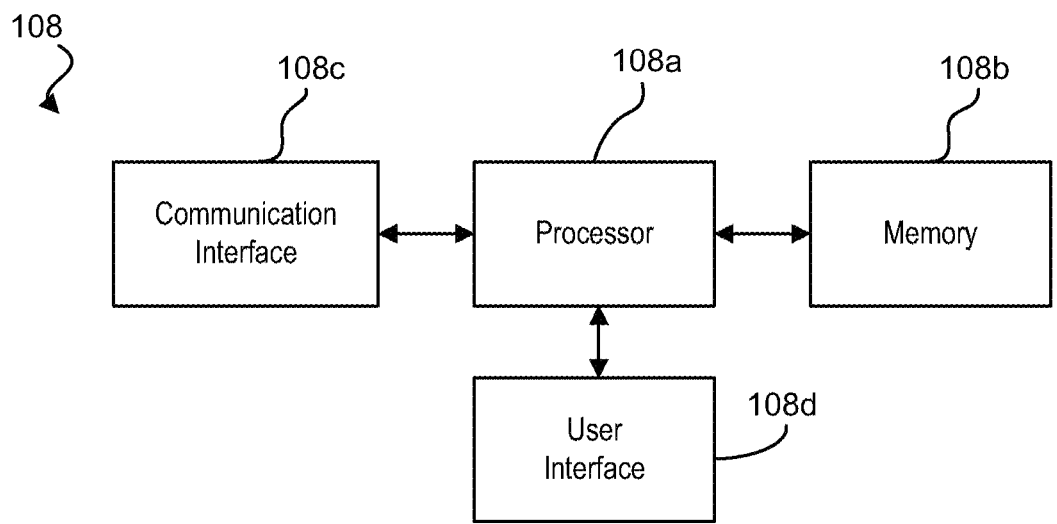
FIG. 1B is a simplified block diagram of a computing device in accordance with at least some embodiments.

Referring now to FIG. 1B, there is illustrated a schematic block diagram of an example computing device 108 and/or an example server 110. While the remainder of the discussion herein is in reference to the computing device 108, it will be understood that the discussion is equally applicable to the server 110.

As shown, the computing device 108 may include a processor 108a in communication with a memory 108b, a communication interface 108c, and a user interface 108d.

Processor 108a may receive information from the various components of the computing device 108 and may be configured to execute a plurality of instructions using the received information, as described further herein.

The memory 108b may be, for example, a non-volatile read-write memory which stores computer-executable instructions and data, and a volatile read-write memory (e.g., random access memory) that may be used as a working memory by processor 108a.

In various cases provided herein, the executable instructions on memory 108b include those provided by the flight management system 102.

Communication interface 108c may be configured to send and receive data. Communication interface 108c may, for example, comprise a wireless transmitter or transceiver and antenna. In some embodiments, the communication interface 108c may receive information and data from one or more of UAVs 104a to 104c. This information and/or data can then be transmitted to the processor 108c for processing. In other cases, the communication module 108c can transmit instructions and/or data to one or more UAVs 104a to 104c. Accordingly, communication interface 108c can be configured to provide duplex communication.

User interface 108d may be one or more devices that allows a user, or operator, to interact with the computing device 108. The user interface 108d may have a keyboard, touchscreen, or other input device that allows a user to input instructions.

In at least some embodiments provided herein, a user (i.e. the UAV operator) may insert commands (i.e., in respect of a UAV route), or requests for information, via the user interface 108d which are to be transmitted to one or more of UAVs 104a to 104c. In other cases, the computing device 108 or server 110 may receive information or message from one or more UAVs 104a to 104c. These messages may be decoded by the flight management system 102 (i.e. according to executable instructions stored, for example, on the memory 108b). These messages may then be displayed to the user via the user interface 108d. To this end, the user interface 108d may include a graphical user interface (GUI) to facilitate use by the computer operator. The user interface may also include a web page located on a web browser.

Figure 2A:
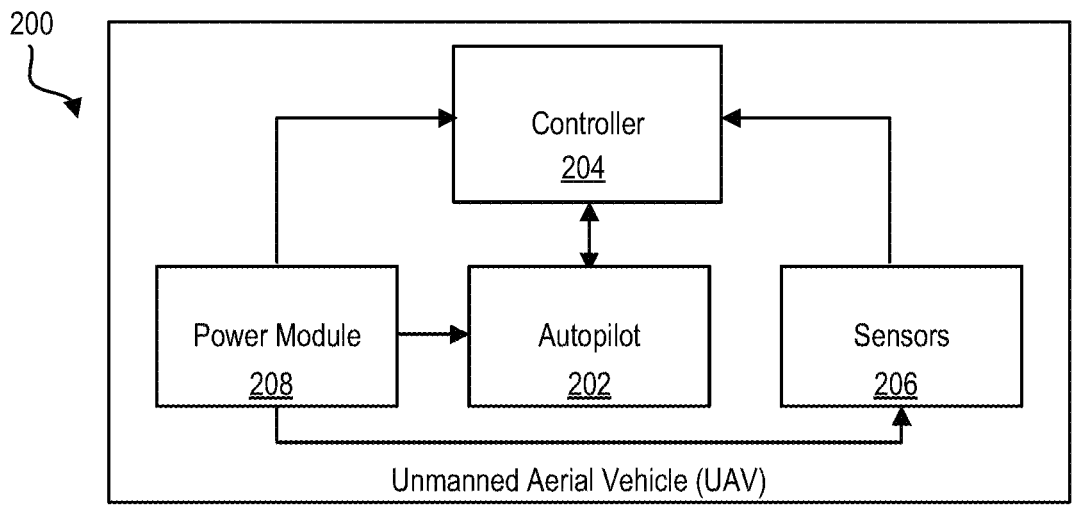
FIG. 2A is a simplified block diagram of a UAV.

Referring now to FIG. 2A, there is illustrated a simplified block diagram of a UAV 200. The UAV 200 may be analogous to one of UAVs 104a to 104c of FIG. 1A.

As shown, the UAV 200 may include an autopilot 202 in data communication with a UAV controller 204. In various cases, the UAV 200 may also include a power module 208 and one or more sensors 206.

The controller 204 may be a direct digital control (DDC) controller configured to facilitate communication between the flight management system 102 and the on-board autopilot 202.

For example, in at least some cases, the controller 204 may be configured to receive commands from the flight management system 102 (operating on the computing device 108) via the network 106. These commands are then transmitted by the UAV controller 204 to the autopilot 202. In other cases, the controller 204 may be configured to transmit information to the flight management system 102 in respect of the operation of the controller 204 and/or the autopilot 202.

The UAV autopilot 202 may be a system for controlling the trajectory and motion of the UAV 200. Generally, an autopilot is required to receive a pre-planned route, use sensors to determine position orientation and velocity parameters of the UAV, and to control motors and other control devices on the UAV to control the UAV and cause it to follow the preplanned route. The autopilot should also be capable of receiving and acting on changes to the route, as well as responding to action commands (e.g., landing, hovering, changing altitude, etc.). While some present autopilots may not be capable of autonomously detecting and responding to adverse events, e.g. unexpected weather conditions or obstacle avoidance, that may require changes to the route, it is anticipated that autopilots will increasingly incorporate such capabilities in the future, e.g. with the use of artificial intelligence.

In at least some embodiments, the autopilot 202 controls the UAV 200 based on action commands received from the flight management system 102, via the UAV controller 204.

Sensors 206 may be on-board sensors which configured to measure various parameters. By way of non-limiting examples, sensors 206 may include temperature sensors, current sensors, velocity sensors, airspeed sensors, altitude sensors, and/or inertial measurement units (IMUs) (e.g., which include gyroscopes, magnetometers and accelerometers). In various cases, measurements collected by the sensors 206 may be transmitted to the UAV controller 204. Further, and as described in more detail herein, the UAV controller 204 may then transmit the sensor measurements as part of "heartbeat" messages transmitted to the flight management system 102.

A UAV may have a variety of motors, actuators, lights and control devices, and also a variety of sensors, such as those mentioned above. E.g., it may include navigation lights, bay doors and associated motors and avionics. As required, each of these may be connected to one, or possibly both of the controller and the autopilot, for receiving control signals and for transmitting data. While the autopilot may be controlled by the controller, it may receive inputs from sensors directly, and correspondingly may control drive motors, etc. directly.

A power module 208 is also provided to provide power to the various components of the UAV 200. The power module 208 may include, for example, an avionics battery capable of supplying power to the UAV 200 for a determined period of time, as well as a servo battery that is configured to supply power to the UAV motors.

Figure 2B:
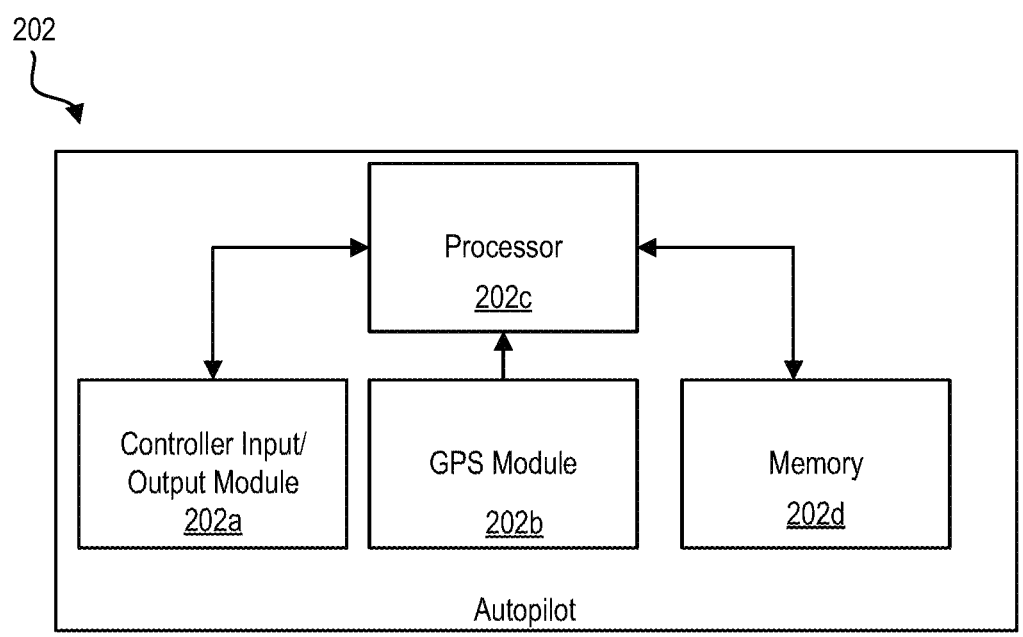
FIG. 2B is a simplified block diagram of a UAV autopilot.

Referring now to FIG. 2B, there is illustrated a simplified block diagram of the autopilot 202.

The autopilot 202 may include, for example, an input/output module 202a, a GPS module 202b, a processor 202c, and a memory 202d.

The input/output 202a may be configured to send and receive data to and from the UAV controller 204. For example, the input/output module 202a may be configured to transmit information to the UAV controller 204. This may be information requested by the flight management system 102. In other cases, the input/output module 202a may receive commands from the UAV controller 204 in respect of the operation of the UAV (e.g., take-off, landing, change of route). These may be commands received by the UAV controller 204 from the flight management system 102. In at least some embodiments, the input/output module 202a may include a serial communication interface to facilitate serial communication with the UAV controller 204.

The GPS module 202b is configured to receive GPS data coordinates for the UAV 200. In some cases, the GPS data coordinates retrieved by the GPS module 202c may be communicated to the flight management system 102 via the UAV controller 204.

The processor 202c may receive information from the various components of the autopilot 202 and may be configured to execute a plurality of instructions using the received information, as described further herein.

The memory 202d may be again, for example, a non-volatile read-write memory which stores computer-executable instructions and data, and a volatile read-write memory (e.g., random access memory) that may be used as a working memory by processor 202c. In various embodiments, the memory 202d may store route or pattern information for the UAV 200. The route information may have been received, for example, from the flight management system 102 via the UAV controller 204 (e.g., using a route file generated by the flight management system 102). In other embodiments, the memory 202d can store various information in respect of various autopilot parameters. The autopilot parameters may be provided to the UAV controller 204 upon an information request from the flight management system 102.

A route file typically consists of waypoints (GPS, altitude, speed, climb rate, etc.) and instructions on what to do if the UAV gets into trouble (hover, land, emergency, etc.). The Flight Management System (102, 300) creates the routes and ensures they are valid, i.e. route does not move through no fly-zones, does not violate license parameters, contains valid takeoff and landing zones, etc.

Different UAVs can have different types of autopilots, which in turn, require different route files. The Flight Management System 102 keeps track of each UAV and its autopilot and creates route files specifically for each type of autopilot. The Flight Management System 102 may be designed to accommodate different types of autopilots through firmware versions.

Figure 2C:
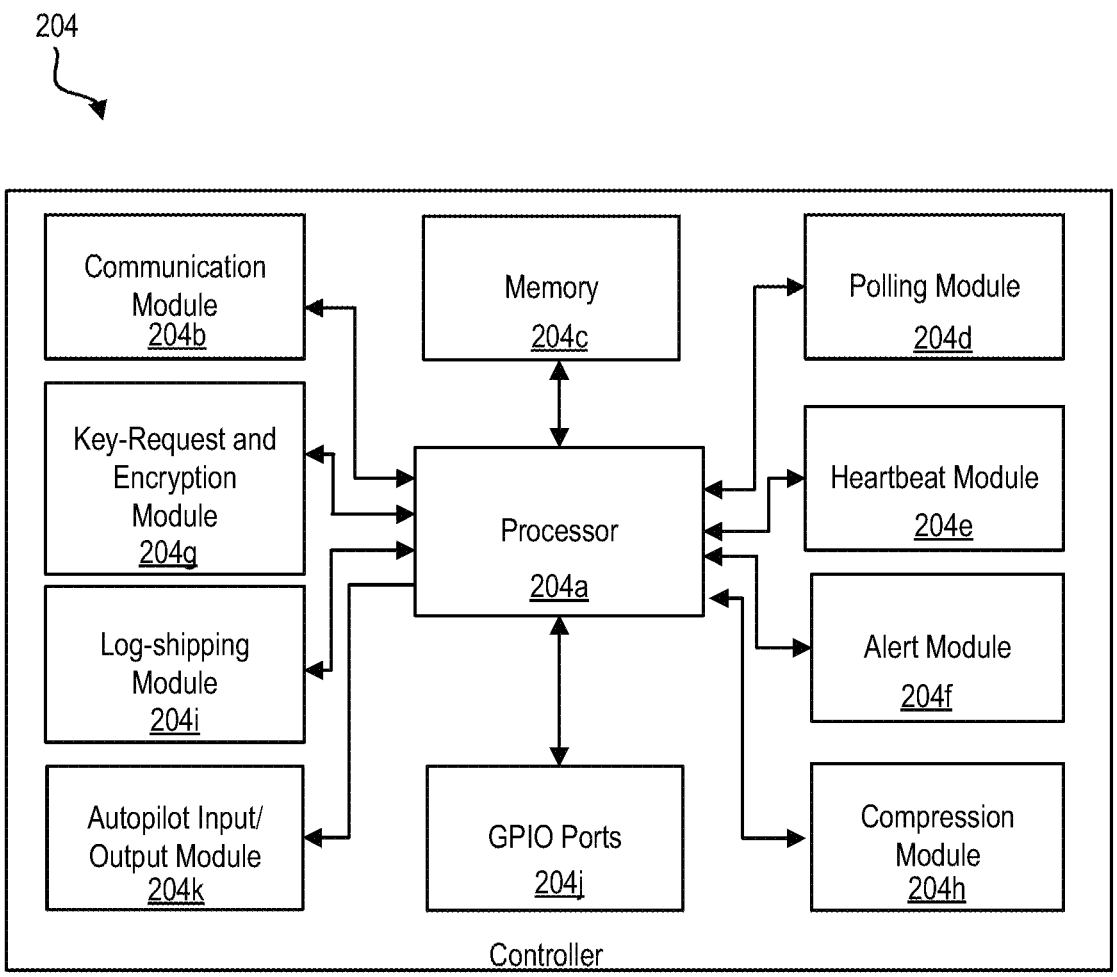
FIG. 2C is a simplified block diagram of a UAV controller.

Referring now to FIG. 2C, there is illustrated a simplified block diagram of the UAV controller 204.

As shown, the UAV controller 204 may include a processor 204a, a communication module 204b, a memory 204c, a polling module 204d, a heartbeat module 204e, an alert module 204f, a key-request and encryption module 204g, a compression module 204h, a log-shipping module 204i, one or more GPIO ports 204j, and an autopilot input/output module 204k.

The processor 204a may receive information from the various components of the UAV controller 204, and may be configured to execute a plurality of instructions using the received information, as described further herein.

The memory 204c may be, for example, a non-volatile read-write memory which stores computer-executable instructions and data, and a volatile read-write memory (e.g., random access memory) that may be used as a working memory by processor 204a.

In various embodiments disclosed herein, the memory 204c may store commands received from the flight management system 102 (e.g., action commands). In other embodiments, the memory 204c may also store information collected by the UAV controller 204 other devices located on-board the UAV 204 (e.g., information from sensors 206). In still other embodiments, the memory 204c may store computer-executable programs which facilitates communication between the UAV controller 204 and the autopilot 202. For example, the program can be an autopilot specific software. In yet still other embodiments described herein, the memory 204c may store software, or processor executable-instructions, in respect of the services provided by the polling module 204d, the heartbeat module 204e, and/or the alert module 204f of the UAV controller 204.

Communication module 204b may be configured to send and receive data or information, via network 106 to and from the flight management system 102, operating for example, on the computing device 108 or server 110. Communication module 204b may, for example, comprise a wireless transmitter or transceiver and antenna, and may further include a modem. In some embodiments, the communication module 204b may receive information and data from the flight management system 102 which can then be transmitted to the processor 204a for processing. In other cases, the communication module 204b can transmit data to the flight management system 102 operating on the computing device 108 or the server 110. Accordingly, communication module 204b can be configured to provide duplex communication In at least some embodiments, the communication module 204b may be further configured for multiple methods of communication. By way of non-limiting examples, the communication module 204b may be configured for Ethernet, Wi-Fi, cellular, satellite, Ultra High Frequency (UHF), and/or Very High Frequency (VHF) communication. This ensures that the UAV controller 204 is in constant communication with the flight management system 102.

The polling module 204d, as explained in further detail herein, is associated with the control service of the flight management system 102. In particular, the polling module 204d is operable to generate instructions, executable by the processor 204a, for transmitting periodic poll requests to the flight management system 102. Periodic polling is used to determine whether the flight management system 102 has instructions in queue for the UAV 200 (e.g., commands or requests for information).

The heartbeat module 204e is associated with the heartbeat service of the flight management system 102. The heartbeat module 204e is configured to generate instructions to transmit periodic and continuous 'heartbeat' messages to the flight management system 102. As explained further herein, the heartbeat messages may include information in respect of the status and/or location of the UAV 200. For example, the heartbeat messages may include periodic information on the GPS location of the UAV 200, as retrieved from the GPS module 202c of the autopilot 202. As explained in further detail herein, heartbeat messages may be transmitted to the flight management system 102 using User Datagram Protocol (UDP). In these cases, the 'heartbeat message' may require encryption and compression to ensure that the message is transmitted securely and occupies minimum transmission bandwidth.

The alert module 204f is associated with the alert service of the flight management system 102. The alert module 204f is configured to generate instructions to transmit unexpected alert messages to the flight management system 102. For example, the alert messages may be generated if the autopilot 202 fails to load a command received from the flight management system 102 (e.g., failed to execute take-off or landing).

In various cases, the polling module 204d, heartbeat module 204e, and alert module 204f are located within the memory 204c. More particularly, the memory 204c may store the processor-executable instructions which implement the functionalities of each of the modules 204d to 204f.

The key-request and encryption module 204g is configured to request an encryption key from the flight management system 102. In some cases, the encryption key request is made at the beginning of a flight session, or otherwise when the controller is first powered-on. The encryption key (i.e., received from the flight management system 102) is then used by the module 204g to encrypt communications from the controller 204 to the flight management system 102. For example, messages generated by the heartbeat module 204e may be transmitted over a UDP channel and may be encrypted with the encryption key for additional security (i.e., UDP does not include built-in security). This may accordingly enhance the security of communications between the controller 204 and the flight management system 102. In some embodiments described herein, Security may be further enhanced by ensuring that the encryption key is valid (or usable) for only a single flight session.

While the key-request and encryption module 204g has been illustrated in FIG. 2C as a single module, in other cases, the key-request and encryption module 204g may be comprised of two separate modules (e.g., a key-request module, and an encryption module).

The compression module 204h may be used to compress heartbeat messages transmitted by the controller 204 to the flight management system 102. In particular, this is to ensure that the size of the transmission stream is minimized, and accordingly, does not consume unnecessary transmission bandwidth. This feature is useful where transmission occurs over a satellite connection which are typically low bandwidth and high latency.

The log-shipping module 204i may maintain a log of events and actions undertaken by the UAV controller 204

(e.g., transmitted and received messages, and connection attempts to network 106). This log file may be transmitted to the flight management system 102.

The GPIO ports 204*j* are configured to facilitate communication between the UAV controller 204 and one or more devices on-board the UAV 200. For example, the GPIO ports 204*j* can connect to one or more sensors 206.

The autopilot input/output module 204*k* is configured to allow for communication between the UAV controller 204 and the autopilot 202. To this end, the module 204*k* may be a serial communication interface to facilitate serial communication with the autopilot 202.

Figure 3A:
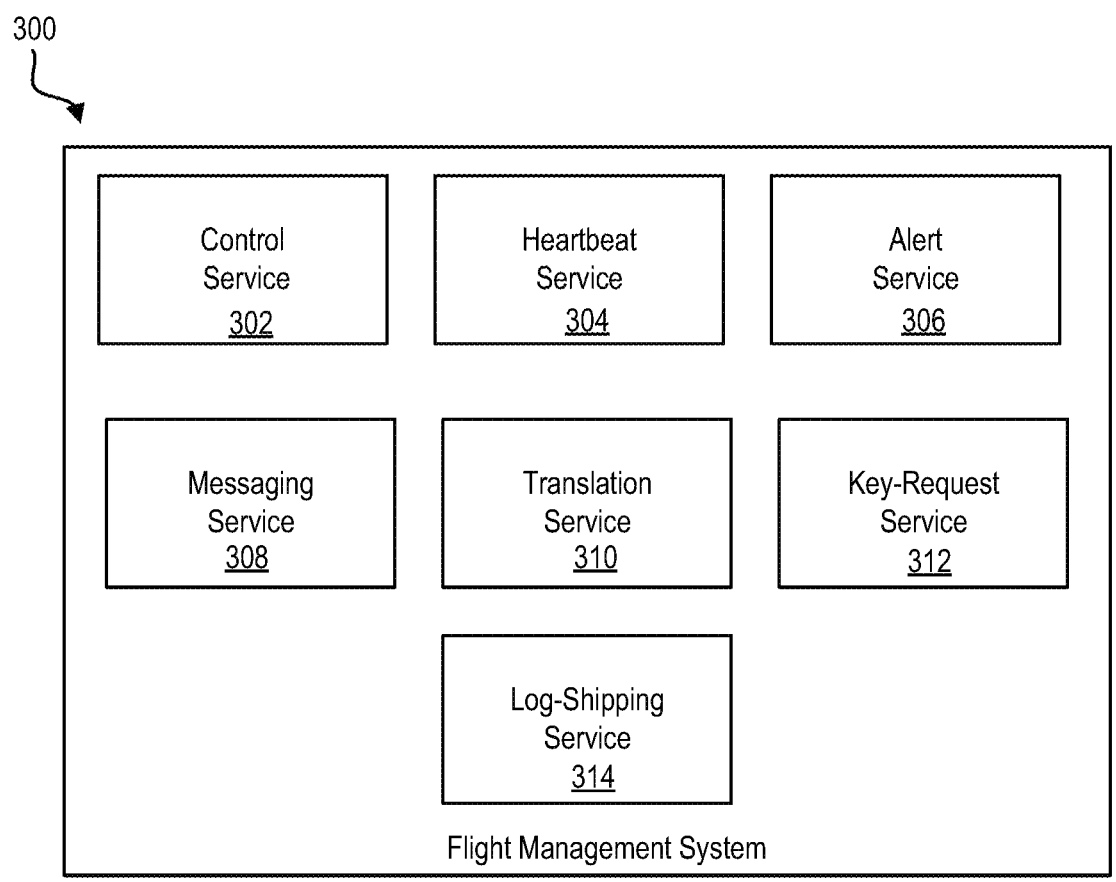
FIG. 3A is a simplified block diagram of a flight management system, in accordance with at least some embodiments.

Referring now to FIG. 3A, there is illustrated a simplified block diagram of a flight management system 300 according to an example embodiment. The flight management system 300 may be analogous to the flight management system 102 of FIG. 1, and in this specification the references 102 and 300 are used interchangeably. In various embodiments, the flight management system 300 may be configured to operate on the computing device 108. For example, the various services offered by the flight management system 300, as described herein, may be implemented as processor-executable instructions which are stored on the memory 108*b* of computing device 108.

As shown in FIG. 3A, the flight management system 300 may include a control service 302, a heartbeat service 304, an alert service 306, a messaging service 308, a translation service 310, a key-request service 312, and a log-shipping service 314.

The control service 302 is a web-based service that is configured to receive polling requests generated by the polling module 204*d* of the UAV controller 204.

As described in further detail herein, the control service 302 may be operable to receive a polling request from the UAV controller 204. In response to the polling request, the control service 302 may generate commands, or requests for information, to be transmitted back to the UAV controller 204. The command messages, and requests for information, may be transmitted to the UAV controller 204 via the communication interface 108*c* of computing device 108. In at least some embodiments, the control service 302 is a REST-based control service.

The heartbeat service 304 is a User Datagram Protocol (UDP) service that is configured to receive and process the periodic and continuous 'heartbeat' messages generated by the complementary heartbeat module 204*e* of the UAV controller 204. To this end, the heartbeat service 304 is constantly "listening" and receptive to heartbeat communications which originate from the UAV controller 204.

The alert service 306 is a web-based service that is configured to receive and process unexpected alert messages generated by the complementary alert module 204*f* of the UAV controller 204. Similar to the heartbeat service 304, the alert service 306 is always "listening" for unexpected alert messages.

The messaging service 308 is configured to generate short message service (SMS) format messages to the UAV controller 204. The SMS messages may include instructions, or information requests. In various cases, the messaging service 308 is used as an alternative, or a back-up, to the control service 302.

In at least some embodiments, the messaging service 308 may also include a queue where messages for each UAV are temporarily stored. In some cases, the messaging service 308 can re-arrange or replace the queued messages. The messages in the queue may also expire before they are retrieved.

The translation service 310 is configured to receives inputs by a user of the computing device 108 (e.g., commands for the autopilot 202, or general information requests from UAV 200), encode these messages, and place the messages in queue for transmission to the UAV controller 204. The translation module 310 is also configured to de-code messages received from the UAV controller 204 to display to the user of computing device 108.

The key-request service 312 is configured to receive encryption key requests from the key-request encryption module 204*g* (i.e., of the controller 204). In response to a request, the key-request service 312 generates and transmits to the controller 204 a new encryption key. In some cases, the encryption key may be valid for at least one flight session. The key-request service 312 may also be configured to provide a session ID to the controller 204 which acts as a unique identifier for the UAV.

The logging-shipping service 214 is configured to accept log file archives generated by the logging-shipping module 204*i* in the UAV controller 204.

Accordingly, the flight management system 300 provides for a number of independent services. According to various embodiments, each service may be configured to accept requests, or messages, from the complementary module in the UAV 204 at different rates of frequencies. For example, the heartbeat service 304 may be configured to operate at a high frequency rate (e.g. 5 hertz), while the control service 302 may be configured to operate at a low frequency rate (e.g. 0.1 hertz). In various cases, the higher frequency rate achieved by the heartbeat service results from the fact that the heartbeat service operates over a UDP channel, while the control service operates over a TCP channel. More specifically, higher frequency transmission rates are achievable over a UDP channel as UDP connections do not require a three-way handshake to transmit data packets, as may otherwise be required for a TCP connection. Other services such as the alert service 304, or the key-request service 314 may only operate when necessary, i.e., rather than operating at a specific frequency.

Figure 3B:
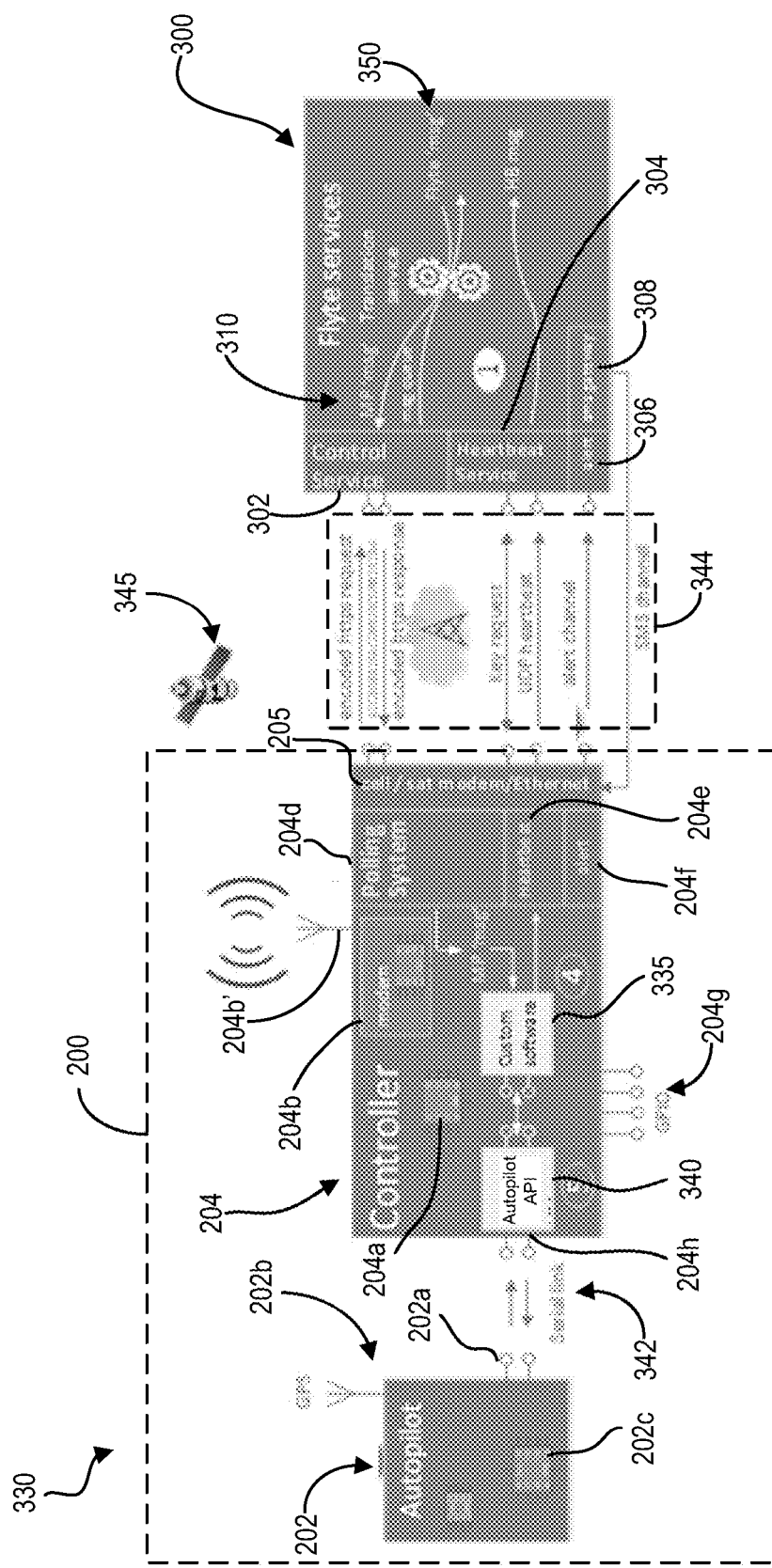
FIG. 3B is a simplified block diagram of a system for secure communication between the flight management system, the UAV controller, and the UAV autopilot.

Referring now to FIG. 3B, there is shown a simplified block diagram of a system 330 for secure communication between the flight management system 300, the UAV controller 204, and the UAV autopilot 202.

As shown, the system 300 includes the autopilot 202 which is provided on-board the UAV 200. The autopilot 202 may include, for example, the autopilot processor 202*c* and the GPS module 202*b*. The GPS module 202*b* may be in data communication with a GPS satellite 345 to receive GPS information and data coordinates. The autopilot 202 may also be in communication with the UAV controller 204 via the autopilot input/output module 202*a*. The input/output module 202*a* may be a serial interface which is configured to receive a serial link 342. To this end, the UAV controller 204 may also include its own input/output module 204*k* which interfaces with the serial link 342.

As further shown by FIG. 3B, an autopilot software API 340 can be provided on the UAV controller 204 to act as a bridge between the UAV controller 204 and the autopilot 202. The API 304 may be included, for example, in the UAV controller's memory 204*c* in the form of computer-executable instructions. The UAV controller 204 also includes the processor 204*a*, GPIO ports 204*j*, the polling system (or module) 204*d*, the key-request and encryption module 204*g* (not shown), the heartbeat module 204*e*, the alert module 204*f*, the log-shipping module 204*i* (not shown), and the communication module 204*b*. In various embodiments, the communication module 204b includes a modem (including a cell/satellite modem 205), as well as an antenna 204b'.

Custom software, or firmware, 335 can be provided on the UAV controller 204 to control at least the operation of the polling module 204d, the heartbeat module 204e, the alert module 204f, the key-request and encryption module 204g, and the log-shipping module 204i, as well as communication with the autopilot 202. Similar to the API 340, the custom firmware 335 can be included on the UAV controller's memory 204c as computer-executable instructions.

Communication between the UAV controller 204 and the flight management system 300 may occur over a wireless data network 344. Wireless data network 344 may be analogous to the network 106 of FIG. 1. As explained in further detail herein, the data network 344 may include one or more "channels" which facilitate communication between the various services on the flight management system 300 and the corresponding modules in the UAV controller 204.

The flight management system 300 includes the control service 302, the heartbeat service 304, the alert service 306, the messaging (or SMS service) 308, the key-request service 312 (not shown), as well as the log-shipping service 314 (not shown). The translation service 310, which is also included in the flight management system 300, is configured to receive and de-code messages received from the various services 302 to 314. The de-coded content of these messages may then be used by the flight management system 300 to control various other peripheral systems connected to the flight management system. For example, in some cases, the messages may be used by the flight management system 300 to determine that a UAV is approaching a UAV landing spot. The flight management system 300 can accordingly prepare the UAV landing spot for the approaching UAV by transmitting appropriate messages and/or signals thereto. In other example cases, the de-coded messages can include secret keys, questions, or PINs which are processed by the flight management system 300 and displayed to, for example, a user of computing device 108 (e.g., a UAV handler). The UAV handler may then use the secret key or PIN for opening a locked gate for the UAV landing spot. In still other example cases, the messages may prompt various alert signals (e.g., lights or sounds) to be played to a user of computing device 108. In at least some embodiments, the translation service 310 is also used to encode messages (e.g., commands or requests for information) for transmission from the flight management system 300 to the UAV controller 204 via the appropriate service.

In view of the foregoing, the operation of each of the control service 302, heartbeat service 304, alert service 306, and messaging service 308 will now be described herein in further detail.

(a) Control/Polling Service

The control service allows the flight management system to: (a) transmit commands to one or more of UAVs 104a to 104c, and/or (b) request information from one or more UAVs 104a to 104c. As explained above, the control service is configured to work concomitantly with the polling module 204d of the UAV controller 204. Accordingly, the control service may be referred to herein interchangeably as the polling service.

Figure 11:
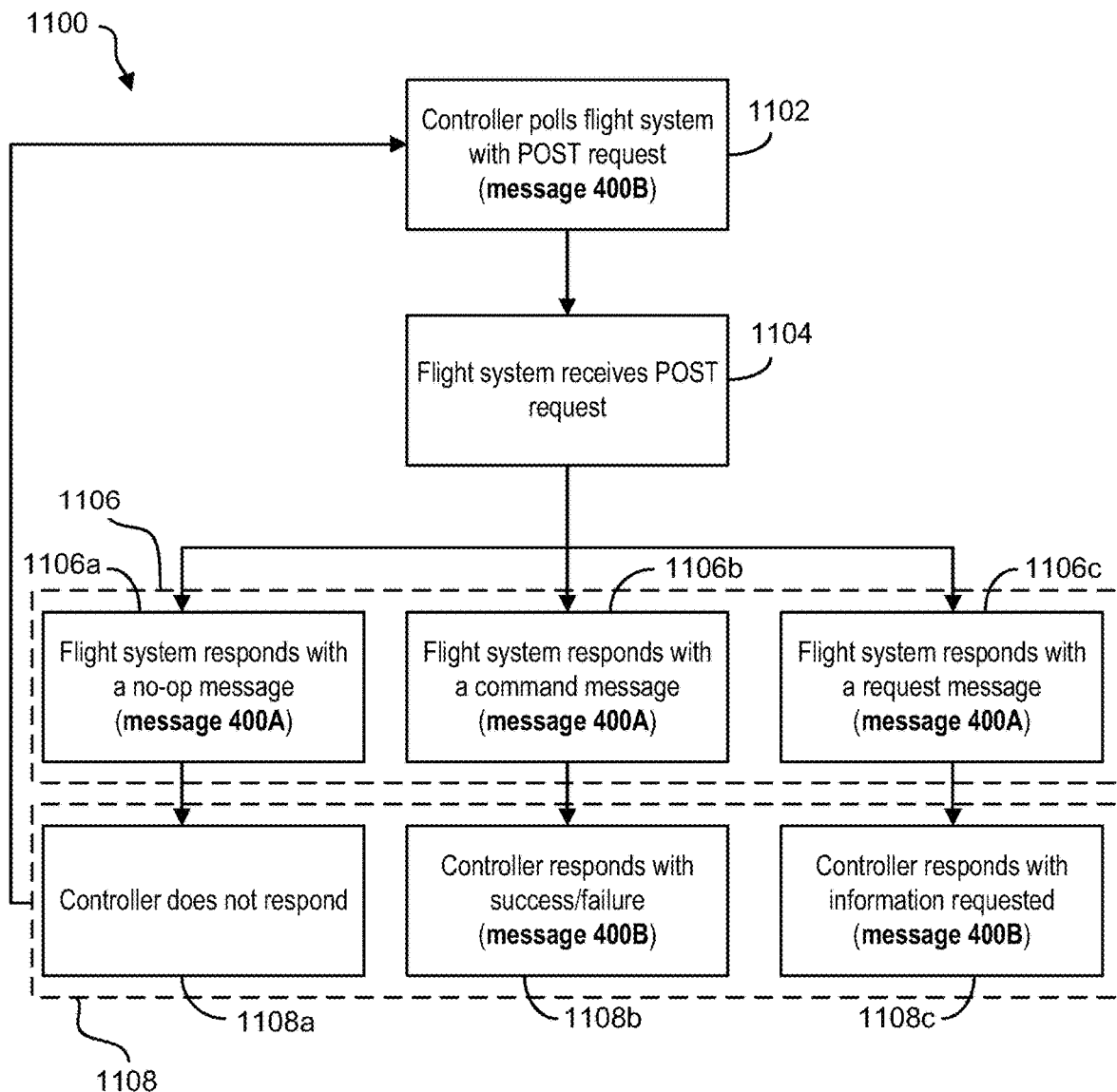
FIG. 11 is a process flow diagram for an example method for a control/polling service, according to some embodiments.

Referring now to FIG. 11, there is shown in more detail a process flow diagram for an example method 1100 for implementing the control/polling service according to an example embodiment. The method 1100 is carried out by the UAV controller 204 and the flight management system 102, 300 (e.g., operating on the computing device 108).

At 1102, the UAV controller 204 may initiate communication with the flight management system 102 by sending a poll request over network 106. In various embodiments disclosed herein, all communication between the UAV controller 204 and the flight management system 102 is initiated by the UAV controller 204. In other words, the UAV controller 204 is not configured to accept un-solicited requests and information from the flight management system 102.

The objective of the poll request is to determine whether the flight management system 102 has any commands, or information requests, in queue for the UAV 200. In various embodiments, the UAV controller may transmit poll requests to the flight management system 102 at predetermined frequencies to determine whether there are instructions in queue. As described further herein, the polling frequency may be set by commands sent from the flight management system 102 to the UAV controller 204.

The poll request may be implemented using a Secure HyperText Transfer Protocol (HTTPS) POST method which is encrypted using Transport Layer Security (TLS). As also explained further herein, this method may ensure that communication between the UAV controller 204 and the flight management system 102 is secure (i.e., by preventing man-in-the-middle attacks). In various embodiments, the UAV controller 204 is configured to direct the poll requests over the internet (i.e. network 106 of FIG. 1) to a location having a known Uniform Resource Locator (URL) identifier which is associated, and accessible, by the control service 302 of the flight management system 300

At 1104, the flight management system 102, operating on the computing device 108, may receive the poll request from the UAV controller 204.

At 1106, the flight management system 102 may respond to the poll request by transmitting an HTTPS response. The HTTPS response may contain one of three messages: (a) an information request message, (b) a command message, or (c) a no-op message.

In the case of an information request message, the flight management system 102 will transmit a response at 1106c which requests information in respect of the UAV controller 204, the autopilot 202, and/or various devices located onboard the UAV 200. For example, the flight management system 102 may request information in respect of readings for sensors mounted onto the UAV 200.

If the UAV controller 204 receives an information request message, then at 1108c, the UAV controller 204 will respond with the requested information.

The flight management system 102 may also transmit command messages to the UAV controller 204. For example, the commands may be in respect of a UAV action to be communicated to, and executed by, the autopilot 202 (e.g., landing, taking-off, or loading route information). In other cases, the command message may be in respect of setting, or defining, a particular controlling parameter (e.g., setting the polling period).

If the UAV controller 204 receives a command message, then at 1108b, the UAV controller 204 will respond with a message indicating whether the command was successfully or un-successfully received. An un-successfully received message may result from the command message being garbled, or otherwise corrupted, during transmission. As explained herein, the UAV controller 204 may determine whether the command message was corrupted during transmission by using a hashing verification method.

The flight management system 102 may also transmit a simple no-op message at 1106a. A no-op message is a simple acknowledgement by the flight management system 102 that the poll request was received, but that there is otherwise no commands or information requests in queue to be transmitted.

If the UAV controller 204 receives a no-op message, then the UAV controller 204 will perform no further action.

As explained herein, each of response 1108*a* to 1108*c* may also be implemented using an HTTPS POST method.

Once the UAV controller 204 has transmitted a response at 1108, the method 1100 will return to 1102 whereby the UAV controller 204 will resume its periodic polling of the flight management system 102.

The loop generated by method 1100—i.e., as between the flight management system 102 and the UAV controller 204—can operate using either a persistent or non-persistent HTTPS connections. A persistent connection has the advantage of not requiring a build up and take down of the connection for each poll request at 1102. A persistent connection approach, however, has potential downside of additional management overhead on the UAV 200, and potentially at the computing device 108, when a connection is unexpectedly lost.

Figure 4A:
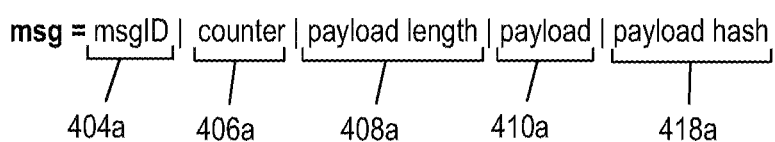
FIG. 4A is an example structure for an HTTPS message which may be transmitted by the flight management system to the UAV controller.
Figure 4B:
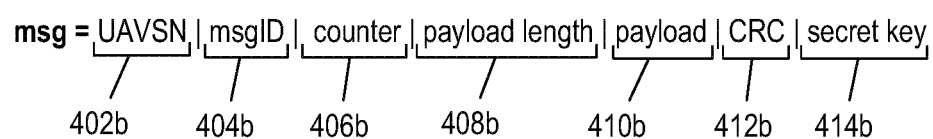
FIG. 4B is an example structure for an HTTPS message which may be transmitted by the UAV controller to the flight management system.

Referring now to FIGS. 4A and 4B, there is shown example structures for HTTPS messages generated by the flight management system 102 and the UAV controller 204 in the method 1100.

Referring now first to FIG. 4*a*, there is shown an example structure for an HTTPS response message 400A that is generated by the flight management system 102 when communicating with the UAV controller 204. In particular, the response message format 400A is used when the flight management system 102 responds to poll request by the UAV controller 204 (i.e. 1106 of FIG. 11)

As shown by FIG. 4A, the response message 400A includes a message identification (ID) field 404A, a counter field 406*a*, a payload length field 408*a*, a payload field 410*a*, and a payload hash field 418*a*. The contents of the fields 404*a* to 418*a* may be encoded as hex strings representing byte arrays. In particular, using hex string to represent byte arrays allows for communication messages to be small and precise. This feature is important for bandwidth constrained channels (e.g., satellite channels).

The message ID field 404*a* identifies the particular contents of the response message 400A (i.e. as expressed by the payload 410*a*). Table 1 below summarizes various example pre-defined message IDs 404A. By way of example, a no-op message (i.e., 1106*a* of FIG. 11) is expressed as a hex string 0x00. By way of a further example, command messages (i.e. 1106*b* of FIG. 11), or information requests (i.e., 1106*c* of FIG. 11) are expressed by message IDs that are unique to the particular command or information request. In various cases, the message ID field 404*a* may be expressed by a one byte hex string.

TABLE 1

Example Message IDs

| Message ID | Message | Description | Payload |
|---|---|---|---|
| No-Op/Routine Poll Messages: | | | |
| 0x00 | No-op/Routine Poll | No message in queue for UAV controller from flight management system. Alternatively, a message ID 0x00 may be used by the UAV controller to indicate a routine poll request. | 0x00000000 |
| Command Messages: | | | |
| 0x10 | Set polling period | Sets the polling period of the UAV controller. | Value in seconds between polling requests e.g. 0x05 - initiate polling request every 5 seconds |
| 0x11 | Set heartbeat period for the UAV controller. | Sets the heartbeat period heartbeats e.g. 0x03 - send heartbeat every 3 seconds | Value in seconds between |
| 0x12 | Set Parameter value | Sets the value of the specified UAV parameter; uses key value format | A hex string representation of the ASCII encoding of the following string: updtParam\|<parameter name>\|<value> |
| 0x20 | Load route data | Load travel points/locations (waypoints), safe zones, circuits, patterns transmitted via a route file | Payload is a compressed ASCII-encoded data. |
| 0x21 | Load route data | Waypoints, safe zones, circuits, patterns transmitted via a route file | Compressed ASCII-encoded data. |
| 0x22 | Start/stop pattern | Causes autopilot to jump to a pre-configured pattern in the loaded route file (a file which includes, but is not limited to, waypoints, flight instructions or patterns), or exit from a pattern | A hex string representation of the ASCII encoding of the following string: StartPattern\|<patternID> |
| 0x23 | Unblock running thread | This function starts a thread of execution that has been stopped. | A hex string representation of the ASCII encoding of the following string: F\|<threadID> |

TABLE 1-continued

Example Message IDs

| Message ID | Message | Description | Payload |
|---|---|---|---|
| 0x24 | Modify waypoint | This function modifies a waypoint in the autopilot's memory buffer. It can modify relative waypoints and absolute waypoints. | A hex string representation of the ASCII encoding of the following string: ModifyWaypoint\|2\|<latitude>\|<longitude> |
| 0x25 | Update Pattern | Update the GPS coordinates in a pattern | A hex string representation of the ASCII encoding of the following string: updtPattern\|<patternIID>\|<latitude>\|<longitude> |
| 0x30 | Set field value | Sets a field's value | A hex string representation of the ASCII encoding of the following string: WriteVar\|<fieldID>\|<value> |
| 0x70 | Cycle avionics power | To reboot the autopilot | 0x00000000 |
| 0x71 | Power on avionics | Power up the autopilot and associated avionics systems | 0x00000000 |
| 0x72 | Power down avionics | Power down the autopilot and associated avionics systems | 0x00000000 |
| 0x73 | Power on 900MHz | Power up the 900Mhz manual control system for manual flight control by a user | 0x00000000 |
| 0x74 | Power down 900Mhz | Power down the 900Mhz manual control system for manual flight control by a user. | 0x00000000 |
| 0x75 | Turn off main power | | 0x00000000 |
| 0x76 | Power on visual object tracker | Power on the visual object tracker system which includes RC | 0x00000000 |
| 0x77 | Power off visual object tracker | Power down the visual object tracker system | 0x00000000 |
| 0xFF | Unsolicited, message | Information spontaneously sent, that was not requested by the flight management system. This message ID is only used in the https request. | This can be an alert message that the autopilot or controller spontaneously sends out. The information is ASCII encoded |
| Information Requests: | | | |
| 0x40 | Get field value | Send a field's value in the follow-up POST request first ASCII encoded: | Paylod is a hex string of the following command which is ReadVar\|fieldID\|value |
| 0x50 | Get controller board firmware revision | Send value in the follow-up POST request | 0x00000000 |
| 0x60 | Get sensor temperatures | Send temperature values in the follow-up POST request | 0x00000000 |

Accordingly, and as described herein, when the UAV controller 204 receives the message 400A from the flight management system 102, the controller may refer to the message ID to determine the contents of the message. To this end, the UAV controller 204 may include an internal database of message IDs, located for example, on the memory 204c of the UAV controller 204. The internal database may be consulted by the UAV controller 204 to de-code the message ID field 404a.

In various embodiments, the message ID may be determined based on inputs received by the flight management system 102 from a user of computing device 108 (e.g., the user may insert commands, or information requests). The flight management system 102 may encode these commands according to the notation in Table 1 using the translation service, or functionality 310 of FIG. 3A. In other embodiments, the message ID may be determined according to pre-defined instructions which are stored on the memory 108b of the computing device 108. For instance, the flight management system 102 may be pre-configured to send commands to power-up or power-down subsystems of the UAV controller 204 at particular pre-defined points in time. Accordingly, in these cases, the flight management system may automatically determine the contents of the message ID field 404a.

The counter field 406a is a number that the flight management system 102 generates with each message to the UAV controller 204. More particularly, and as described herein, when the UAV controller 204 responds to the flight management system 102, it will reflect back the counter integer. This allows the flight management system 102 to "pair-up" any response from the UAV controller 204 with the message 400A. This may be helpful where the flight management system 102 is sending and receiving a plurality of messages to a plurality of UAVs.

In various cases, the counter field 406A is incremented with every message sent by the flight management system 102 to the UAV controller 204. In at least some cases, the counter field 406a may be expressed as a two byte unsigned integer hex string.

The payload length field 408a represents the total length of the payload 410a (i.e. the actual message carried by the message 400A). The payload length field 408a may be expressed as a 4 byte hex string. Where no payload is present (i.e., in a no-op message), the payload length field 408a is simply expressed as a hex string of zeros (i.e., 00000000).

The payload field 410a includes the actual contents of the response message 400A. Table 1 above provides example formats for the payload field 410 in respect of different example message IDs 404a.

More particularly, and in at least some cases, the payload field 410a may include pattern instructions, or updates to patterns instructions, for the autopilot 202 to execute (see e.g., message ID's 0x20 and 0x25 in Table 1, above). These patterns may be in respect of pre-defined flight routes for the UAV 200. In these cases, the payload must specify a pattern identification (ID) numbers (i.e., <patternID>), which identifies the nature of the pattern command. Table 2 below provides example Pattern ID commands which can be transmitted by the flight management system 102 to the UAV controller 204:

TABLE 2

Example Pattern Identification (ID) Numbers

| Command | Type | Pattern ID | Description |
|---|---|---|---|
| Hover here | Pattern | <num> | UAV will stop whatever it is doing and hover at the current location indefinitely. |
| Fly home | Pattern | <num> | UAV will change course and fly to the home location (where ever it took off from). It will then hover above the home location until another command is received. |
| Land here | Pattern | <num> | UAV will stop whatever it is doing and land at its current location. |
| Land at home | Pattern | <num> | UAV will change course and fly to the home location. It will then land at the home location. |
| Safe zone | Pattern | <num> | UAV will change course, fly to a pre-programmed GPS coordinate and land there. |
| Exit pattern | Pattern | <num> | UAV will exit the current pattern and return to the main mission. |
| GoTo here | Pattern | <num> | Fly to GPS coordinates in pattern <num>. Use modify waypoint or modify command to first set the GPS coordinates in the pattern. This way the UAV can be commanded to go to a position by executing this pattern |
| Emergency stop | Thread | <num> | UAV will cut power to the motors. |
| Update pattern <num> | N/A | — | Update the GPS location stored in pattern <num> which may be a 'Safe-Zone' pattern |

The payload hash field 418a includes a hash for the payload field 410a. In various embodiments, the payload hash 418a is an MD5 hash of the payload, and is expressed as a hex string of 16 bytes. As explained in detail herein, the payload hash 418a is used by the UAV controller 204 to determine whether message 400A—received from the flight management system 102—was corrupted, or garbled, during transmission. If the message is corrupted (or garbled) during transmission, the flight management system 102 may be configured to re-send the message a pre-defined number of times.

Referring now to FIG. 4B, there is shown an example structure for an HTTPS message 400B which is generated by the UAV controller 204 when transmitting messages to the flight management system 102.

The message structure 400B is used in at least two situations: (1) in a routine poll generated by the UAV controller 204 (i.e. 1102 of FIG. 11), and (2) in a response poll to the flight managing system 102 (i.e., 1108 of FIG. 11).

As shown by FIG. 4B, the message 400B includes a UAV serial number field 402b, a message identification (ID) field 404b, a counter field 406b, a payload length field 408b, a payload field 410b, a cyclic redundancy check (CRC) field 412b, and a clear text secret key field 414b. The contents of the fields 404a to 418a may be encoded as hex strings representing byte arrays.

The UAV serial number field 402b is populated by a serial number unique to each UAV. In FIG. 1, for example, each UAV 104a to 104c is allocated a unique serial number. This allows the flight management system 102 to determine, upon receipt of message 400B, where message 400B is originating from. To this end, the flight management system 102 maintains an internal database of each UAV serial numbers for each UAV in the system 100 of FIG. 1. This database may be maintained, for example, on the memory 108b of the computing device 108. The UAV serial number may be, in some cases, expressed as a 12 byte hex string.

The message ID field 404b is identical (and often a reflection) of the message ID field 404a of message 400A. That is, the UAV controller 204 will often reflect back the message ID 404a received from the flight management system 102. By reflecting back the message ID 404a, the flight management system 102 is able to pair the message 400B with the message 400A upon receipt of the message 400B (i.e., similar to the function of the counter field 406a).

If the message 400B is sent as an initial poll request (i.e. rather than as a response), the message ID field is simply a hex string of zeros (i.e. "00"). In various cases, the message ID is a one byte hex string.

The counter field 406B, as discussed above, is also a reflection of the message counter field 406a received in message 400A. In various cases, the message counter field 406b is occupied by a two byte unsigned integer hex string.

The payload length field 408b indicates the length of the payload 410b in bytes. In various cases, the payload length is expressed as a four byte hex string.

The payload field 410b varies depending on the type of message sent.

More particularly, where the message 400B is a routine poll request (i.e. 1102 of FIG. 11), the payload field 410b is empty, and may include a string of zeroes.

Where the UAV controller 204 is responding to a command message (i.e. 1106b of FIG. 11), the payload will indicate whether or not the command was successfully received. For example, the command may be unsuccessfully received if the message 400A was garbled or corrupted during transmission.

More particularly, to determine whether the command was successfully received, the UAV controller 204 will hash the payload 410a of command message 400A. For example, the UAV controller 204 may perform an MD5 hash of the payload MD5. The UAV controller 204 will then determine whether the MD5 hash agrees with the payload hash 418a in message 400A. If the hashes agree, then UAV controller 204 determines the message was received successfully. If the hashes do not agree, the UAV controller 204 determines the message was received un-successfully.

In at least some embodiments, the payload field 410b may contain a message which includes a string of "AAAAAAAA" indicating that the message was received successfully. Otherwise, the payload may include a string of "FFFFFFFFF" indicating that message was not received successfully. As explained in further detail herein, where the message is not successfully received, the flight management system 102 can re-transmit the message a configurable number of times.

Significantly, the contents of payload field 410b only indicates whether the message was received uncorrupted. It does not reflect whether the command was successfully executed. The success of the command execution is addressed by the alert service, as discussed below.

Conversely, if the UAV controller 204 is responding to an information request (i.e., 1016c of FIG. 11) rather than a command message, the payload field 410b will include the requested information. In various embodiments, the first byte of the payload field 410b may include an ID value of the data that was requested, and the remaining bytes may be ASCII text encoded in hex (i.e., "abc123" is 616263313233). Accordingly, this may allow for free-form text messages to be sent back to the flight management system 102.

The CRC field 412b provides a data integrity check for the payload 410b.

The secret key 414b is a clear text message authentication code (MAC) which allows the flight management system 102, upon receipt of message 400B, to verify whether message 400B originates from a valid, and registered UAV Controller 204. In various cases, the clear text secret key in field 414b is a 128 bit Globally Unique Identifier (GUID).

Significantly, the secret key 414b is an important feature for ensuring authenticated communication between the flight management system 102 and UAV controller 204.

Figure 14:
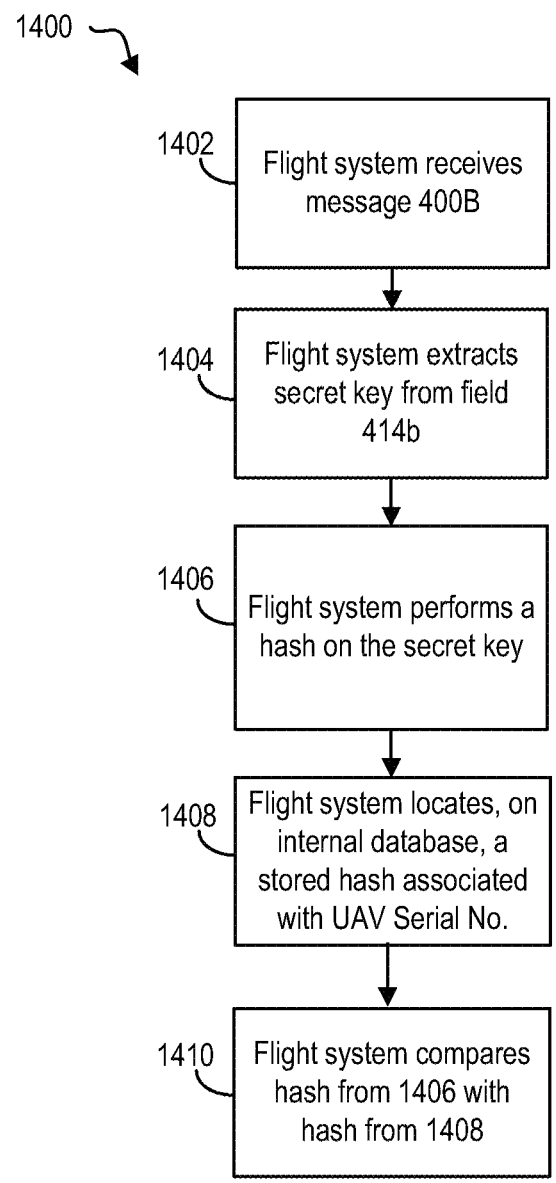
FIG. 14 is a process flow for a method for authenticating, by the flight management system, messages received from the UAV controller.

Referring now to FIG. 14, there is shown a process flow for a method 1400 which allows the flight management system 102 to authenticate the message 400B, upon receipt thereof, using the secret key 414b. The method 1400 may be carried out by the processor 108a of the computing device 108.

At 1402, the flight management system 102 receives the message 400B (i.e. 1106 in FIG. 11). At 1404, the system 102 extracts the secret key from the field 414b. At 1406, the system 102 performs a hash on the secret key. For example, the system may perform a SHA256 hash of the secret key. At 1408, the system will locate, on an internal database (i.e. located, for example, on memory 108b of the computing device 108), a stored hash associated with the UAV serial number located in field 402b. To this end, the system 102 maintains a database of hashes corresponding to each UAV serial number for each UAV in the system 100. At 1410, the system 102 will compare the hash generated at 1406, and the hash retrieved at 1408 to determine if there is a match. If the hashes agree, the message originate from a valid UAV controller 204. If the hashes do not match, or if the secret key field 414b is empty, the system 102 will either dump the message 400B, return an empty response to the UAV controller 204, or otherwise close the communication connection. Accordingly, if a single UAV's controller board's secret key is comprised, it will only affect that single UAV. In that case, the affected UAV controller may be allocated a new secret key.

Referring now to FIGS. 5A to 5C, there is shown example messages which may be transmitted between the UAV controller 204 and the flight management system 102 in a polling transaction. In particular, in the polling transaction of FIGS. 5A to 5C, the flight management system 102 is transmitting a command message to the UAV controller 204.

Referring now first to FIG. 5A, there is shown an example HTTPS routine polling request 500A which is transmitted by the UAV controller 204 to the flight management system 102 (i.e., 1102 of FIG. 11). The polling request 500A may be transmitted according to the HTTPS message structure 400B of FIG. 4B as it is generated by the UAV controller 204.

As shown in the message 500A, the message ID field 404b is set to 00 as this is a routine polling request. The message counter field is currently set at 0x109c, indicating that 4,252 message have been received thus from the flight management system 102. Further, the payload field 410b is empty as routine poll requests do not include a payload message. A clear text secret key is provided in the MAC field 414b.

Referring now to FIG. 5B, there is shown an example response command message 500B, transmitted by the flight management system 102 to the UAV controller 102 (i.e., 1106b of FIG. 11). The response command message 500B may be transmitted according to the HTTPS message structure 400A of FIG. 4A, as the message is generated by the flight management system 102.

As shown in message 500B, the message ID field 404a is populated by a hex string 0x20, which indicates that a command for loading route data will be provided in the payload field 410a. The message counter field 406a has been incremented from hex 0x109C to 0x109D (i.e., the counter is incremented by every message transmitted by the flight management system). Moreover, the message 500B also includes the payload encoded as a hex string, as well as an MD5 hash of the payload.

Referring now to FIG. 5C, there is shown an example HTTPS response message 500C which is transmitted by the UAV controller 204 to the flight management system 102, in response to message 500B (i.e. 1108 of FIG. 11). The message 500C may be transmitted according to the HTTPS message structure 400B of FIG. 4B.

As shown in message 500C, the payload field 410b is a string of hex "A", which indicates that message 500B was successfully received by the UAV controller 204. In particular, it indicates that the payload of message 500B was received un-corrupted, as determined by an agreement of the MD5 payload hash.

Further, as shown, the message 500C reflects back both the message ID field 404b, and the message counter 406b. This allows the flight management system 102 to pair the message 500C as a response to the message 500B.

Figure 5D:
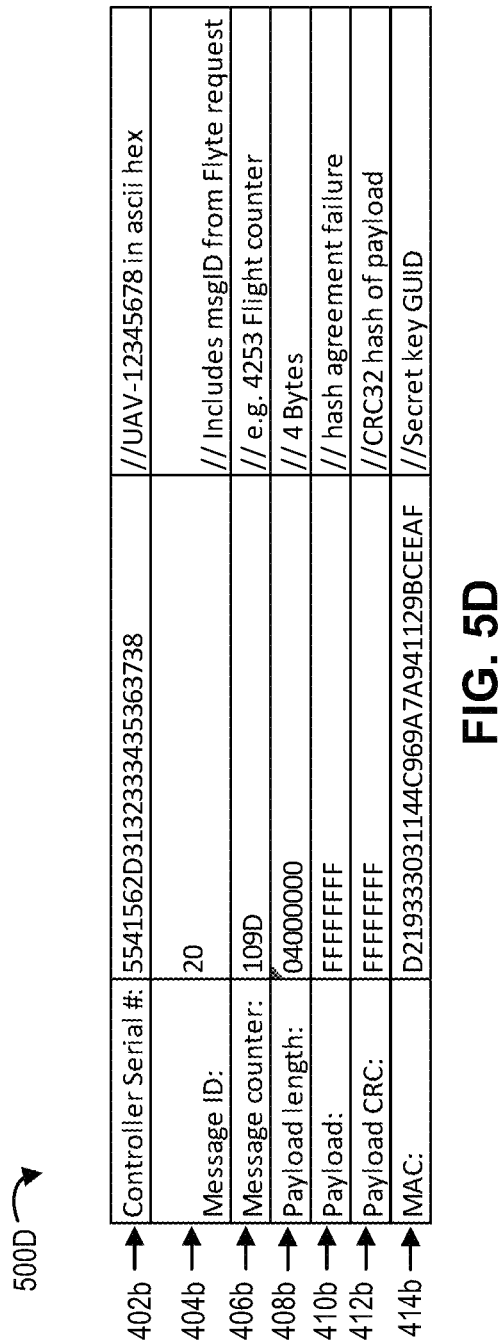

Referring now to FIG. 5D, there is shown an alternative example response message 500D. In this case, the message 500B was not received successfully by the UAV controller 204. The payload field 410b is now populated by a string of hex 'F' indicating a payload hash compare failure. As explained herein, in these cases, the flight management system 102 may re-transmit the message until the UAV indicates the message was successfully received (i.e., the payload field 410b is a string of hex "A"), or until the flight management system 102 has exceeded a pre-defined number of re-transmit attempts.

Referring now to FIGS. 6A to 6C, there is shown further example messages which may be transmitted between the UAV controller 204 and the flight management system 102 in a polling transaction. In the polling transaction of FIGS. 6A to 6C, the flight management system 102 transmits a pattern command to the UAV controller 204.

Referring now first to FIG. 6A, there is shown an example HTTPS routine polling request 600A transmitted to the flight management system 102 (i.e., 1102 of FIG. 11). The polling message 600A is analogous to the polling message 500A of FIG. 5.

Referring now to FIG. 6B, there is shown an example response poll message 600B, transmitted by the flight management system 102, and including the pattern command. The pattern command has a message ID 404a of hex '0x22'. According to Table 2 above, this corresponds to pattern ID "15", which is a command for the UAV to fly to a particular GPS position.

Referring now to FIG. 6C, there is shown an example response message 500C by the UAV controller 204. The payload field 410b indicates the pattern command message 600B was received successfully.

Referring now to FIGS. 7A to 7C, there is shown still further example messages which may be transmitted between the UAV controller 204 and the flight management system 102 in a polling transaction. In particular, in the polling transaction shown in FIGS. 7A to 7C, the flight management system 102 is making an information request from the UAV controller 204 (i.e. 1106c of FIG. 11).

Referring now first to FIG. 7A, there is shown an example routine polling request 600A transmitted to the flight management system 102 (i.e., 1102 of FIG. 11). The polling message 700A is analogous to both the polling messages 500A of FIG. 5, and 600A of FIG. 6.

Referring now to FIG. 7B, there is shown an example response poll message 700B, transmitted by the flight management system 102 with the information request. As shown in the payload field 410a, the request is with respect to information in a field "1937" of the autopilot 202. This field may correspond, for example, to particular data stored in the memory 202d of the autopilot 202.

Referring now to FIG. 7C, the UAV controller 204 returns the requested information in the payload field 410b.

Figure 8A:
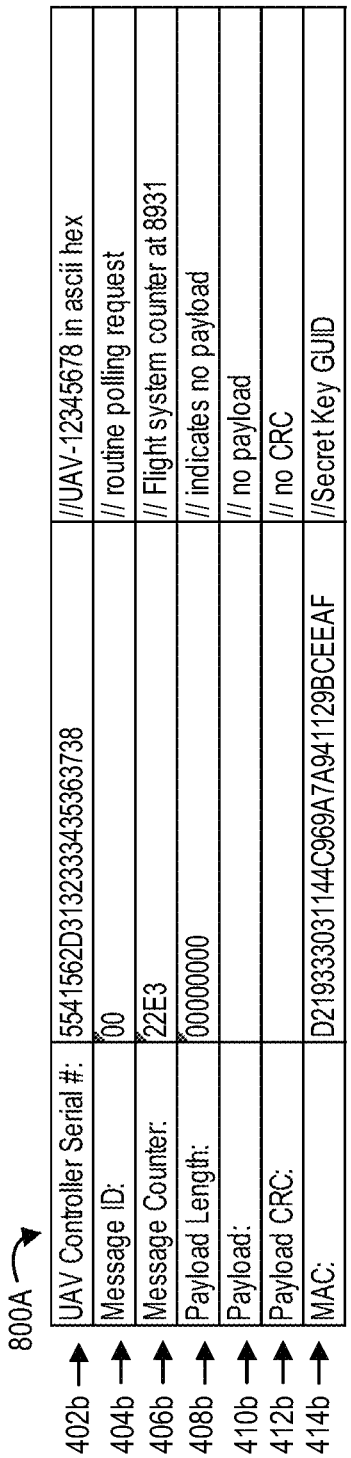
FIGS. 8A and 8B are example message which may be transmitted between the UAV controller and the flight management system in a polling transaction, according to yet still other embodiments.
Figure 8B:
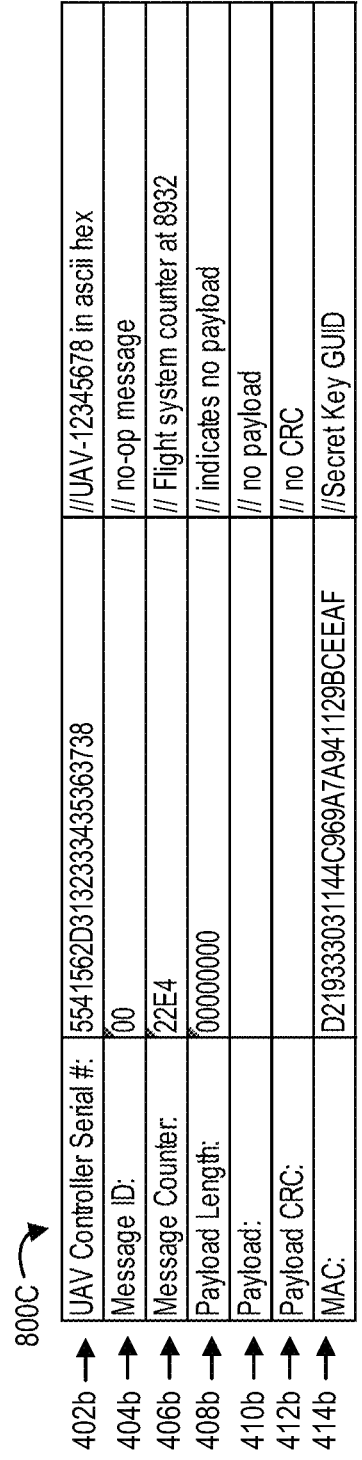

Referring now to FIGS. 8A to 8B, there is shown yet still further example messages which may be transmitted between the UAV controller 204 and the flight management system 102 in a polling transaction. In particular, in the polling transaction shown in FIGS. 8A to 8C, the flight management system 102 is returning a no-op message to the UAV controller 204 (i.e. 1106a of FIG. 11).

Referring now first to FIG. 8A, there is shown an example routine polling request 800A transmitted to the flight management system 102 (i.e., 1102 of FIG. 11). The polling message 800A is analogous to both the polling messages 500A of FIG. 5, 600A of FIG. 6, and 700A of FIG. 7.

Referring now to FIG. 8B, there is shown an example response poll message 800B, transmitted by the flight management system 102. In particular, the message ID is set to "0x00", indicating a no-op message. Further, the payload field 410b is empty.

Figure 12A:
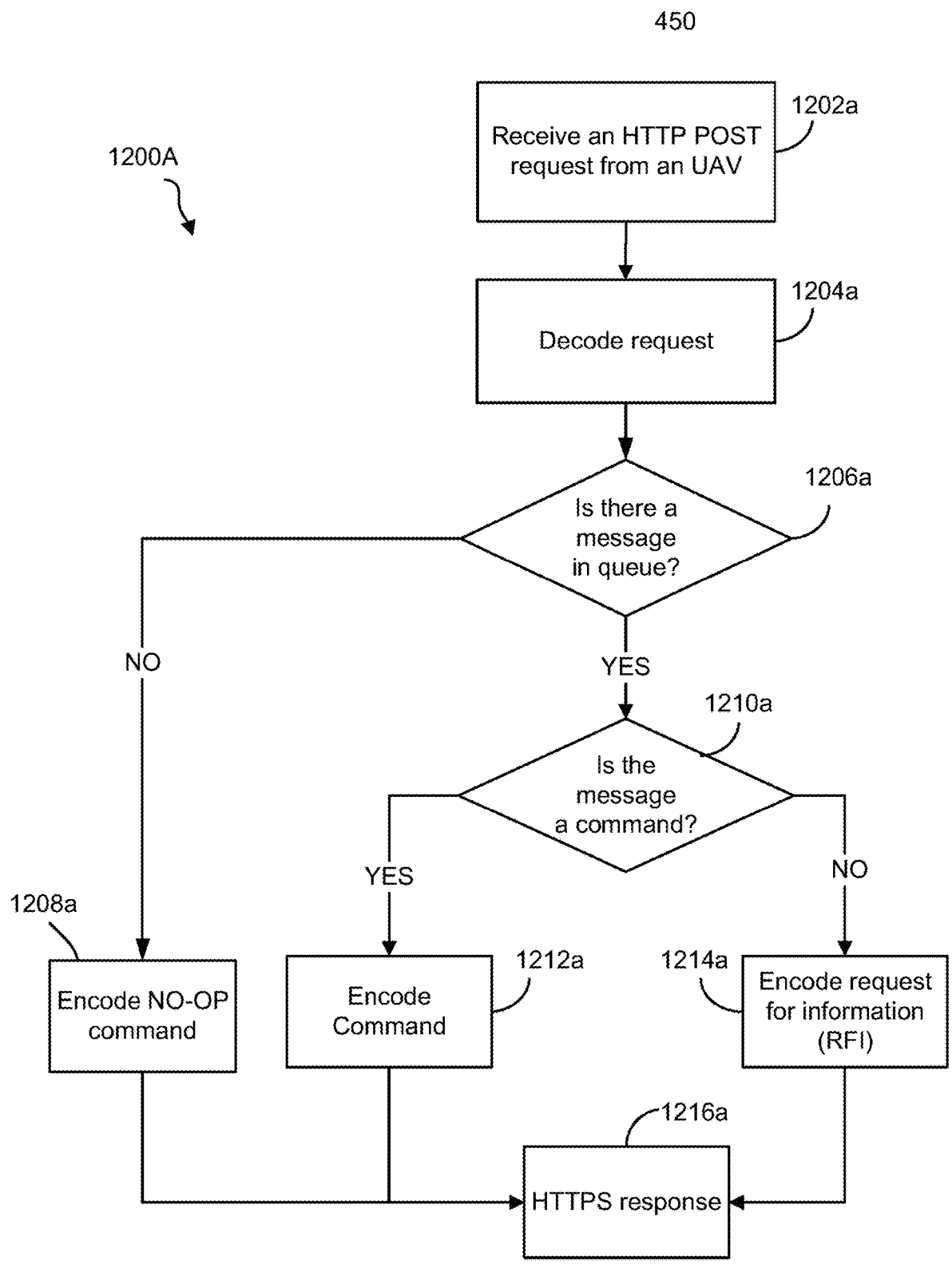
FIG. 12A is a process flow for an example method for implementing the control/polling service, as viewed from the perspective of the flight management system.
Figure 12B:
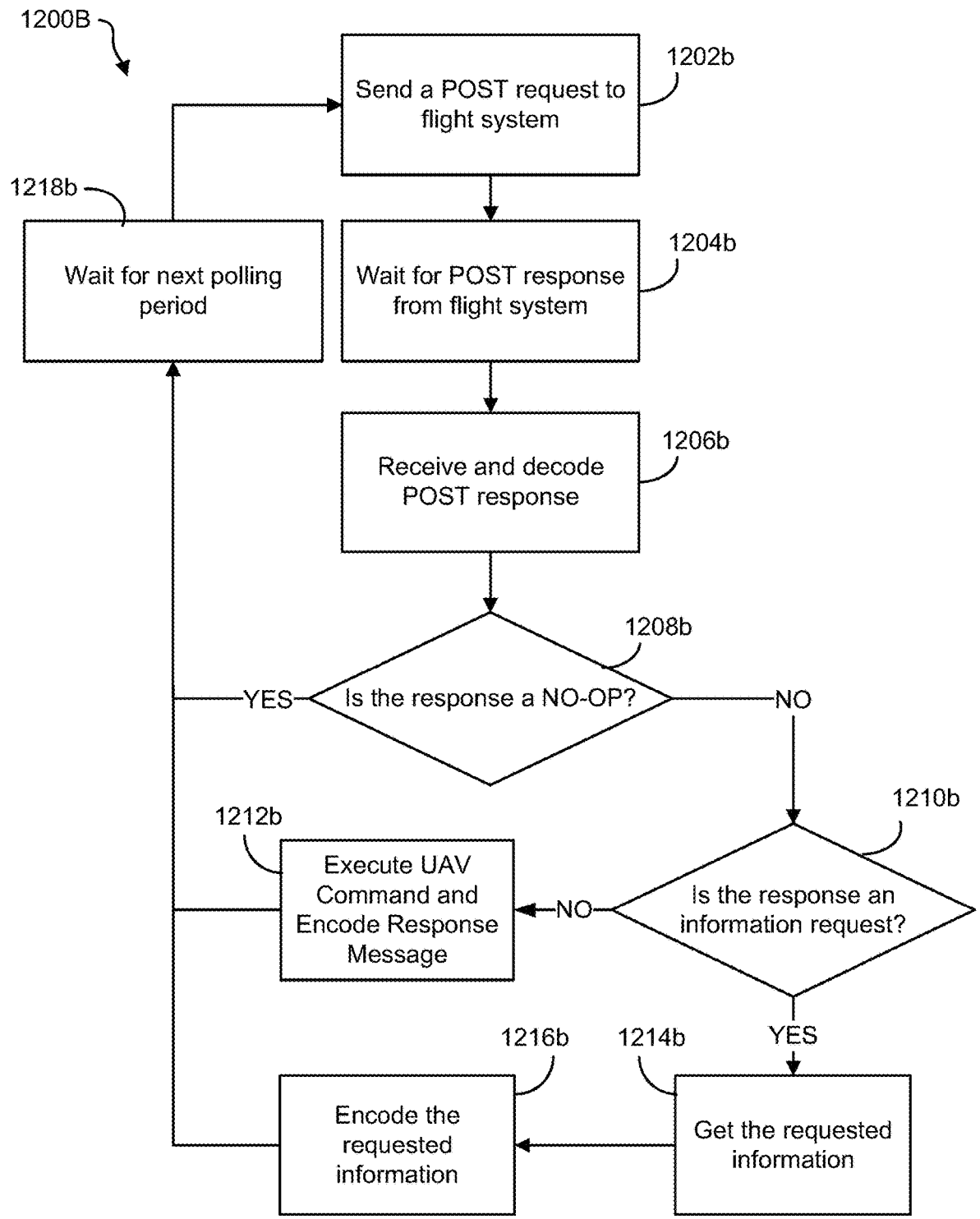
FIG. 12B is a process flow for an example method for implementing the polling/control service, as viewed from the perspective of the UAV controller.

Referring now to FIGS. 12A and 12B, there is shown a process flow for an example method for implementing the control/polling service as described herein.

Referring now first to FIG. 12A, there is shown a process flow for an example method 1200A for implementing the control/polling service as viewed from the perspective of the flight management system 102. The method 1200A may be carried out, for example, using the processor 108a and communication interface 108c of computing device 108.

At 1202a, the flight management system 102, operating on the computing device 108, receives an HTTPS POST request from the UAV controller 204 (i.e., 1102 of FIG. 11). The request may be received by the computing device 108 via the communication interface 108c.

At 1204a, the flight management system 102 decodes the routine poll request (i.e., to determine that the request is in-fact a routine polling request).

At 1206a, the flight management system 102 determines whether a message is in queue for the UAV controller 204. For example, the message in-queue may be a command message, or a request for information.

If no message is in que, the flight management system 102 responds at 1208a by encoding a no-op acknowledgment message. The no-op message is transmitted to the UAV controller at 1216a as an HTTPS response.

If a message is in queue at 1206a, the flight management system 102 determines at 1210a if the message is a command message.

If the message is a command message, the flight management system 102 encodes the command message, at 1212a, according to the notations and message structures described above. The flight management system 102 will then transmit the command message back to the UAV controller 204 as an HTTPS response at 1216a.

If the message is not a command message, it is determined to be a request for information. Accordingly, the flight management system 102 will encode the information request at 1214a according to the methods described above. The management system 102 will then transmit the information request back to the UAV controller 204 as an HTTPS response at 1216a.

Referring now to FIG. 12B, there is shown a process flow for an example method 1200B for implementing the polling/control service as viewed from the perspective of the UAV controller 204. The method 1200B can be carried out, for example, using the processor 204a, and communication module 204b, of the UAV controller 204.

At 1202B, the UAV controller 204 transmits a routine polling HTTPS POST request to the flight management system 102 (i.e. 1102 of FIG. 11).

At 1204b, the UAV controller 204 waits for an HTTPS response from the flight management system 102.

At 1206b, the UAV controller 204 receives and de-codes the response to determine the contents of the message contained therein.

At 1208b, the UAV controller 204 determines whether the response is a simple no-op acknowledgement.

If the response is a no-op acknowledgment, the UAV controller waits for the next polling period at 1218b (as determined by the pre-set polling frequency). The method 1200B then returns to 1202b, whereby the UAV controller 204 transmit another routine polling request.

If the response message is not a no-op acknowledgment, the UAV controller 204 determines whether the response is an information request at 1210b.

If it is determined that the message is an information request, then at 1214b, the UAV controller 204 retrieves the requested information. For example, the requested information may be located on the UAV controller 204 or the autopilot 202. The requested information is then encoded and transmitted to the flight management system 102 at 1216b.

If the response message at 1108b is not an information request, then at 1212b, the UAV controller 204 determines that the message is a command which requires execution. The UAV controller 204 will then encode and transmit a message expressing whether the command was received successfully, or un-successfully (i.e. based on payload hash agreement).

In various cases, where the flight management system 102 receives a failed/un-successful message, the flight management system 102 will keep the message in queue (i.e., at 1206a in FIG. 12A) until a successful message is received back, or until the maximum re-send attempts have been exhausted. If the flight management system 102 receives back a routine polling request, rather than a success/failure message, the flight management system 102 will assume the UAV controller 204 failed to receive the message. Accordingly, in this case, the message will be held in queue by the flight management system 102 until the maximum amount of re-send attempts have been exhausted.

After either 1212b or 1216b, as the case may be, the UAV controller waits for the next polling period at 1218b. The method 1200B then returns to 1202b whereby the UAV controller 204 continues transmitting routine polling request.

(b) Alert Service:

The alert service allows the UAV controller 204 to send unexpected alert messages to the flight management system 102.

In various embodiments, the alert message may indicate that an autopilot command, transmitted by the flight management system 102 via the polling/control service, was not properly executed. In other embodiments, the alert message can indicate a 'status changed' message from the autopilot 202 which indicates, for example, that the autopilot GPS module 202b has lost satellite signal, a servo motor of the UAV has failed, or a fatal error has occurred to the UAV's inertial measurement unit (IMU).

To this end, the alert service may be implemented by the alert module 204f of the UAV controller 204, which generates instructions to transmit alerts, as well as the complementary alert module 306 in the flight management system 300 of FIG. 3A, which has instructions for processing the received alerts.

Similar to the polling service, alert messages may be sent as an HTTPS post requests encrypted using transport layer security (TLS). The UAV controller 204 is configured to direct the alert message over the internet (i.e. network 106 of FIG. 1) to a location having a known Uniform Resource Locator (URL) identifier which is associated, and accessible, by the alert service 306 of the flight management system 300. The URL for the alert service may be different than the polling/control service.

Furthermore, the alert service 306 in the flight management system 300 is constantly receptive and "listening" to any alert message that may be transmitted by the UAV controller 204.

Figure 9:
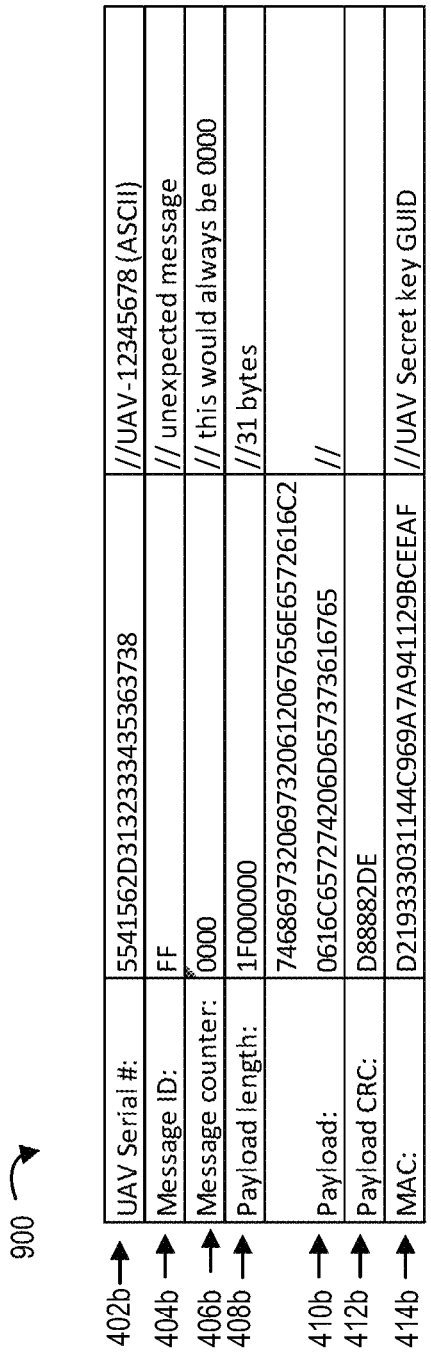
FIG. 9 is an example alert message which may be transmitted by the UAV controller to the flight management system, according to some embodiments.

Referring now to FIG. 9, there is shown an example alert message 900 that may be transmitted by the UAV controller 204 to the flight management system 102, 300.

As shown, the structure of alert message 900 is analogous to the structure of message 400B of FIG. 4B for messages generated by the UAV controller 204.

In particular, as shown in message 900, the message ID field 404b is populated by a hex string "FF", indicating an unexpected/alert message. The payload field 412b indicates that this is a general alert message.

(c) Heartbeat Service:

The heartbeat service allows the UAV controller 204 to periodically transmit 'heartbeat' messages to the flight management system 102, 300 when the UAV 200 is powered on, either in dock, or in flight.

The heartbeat messages provide regular data information in respect of the status and location of the UAV 200. To this end, the instructions for generating the heartbeat messages may be generated by the heartbeat module 204e of the UAV controller 204. The instructions for processing the received heartbeat messages, at the flight management system 102, may be effected by the heartbeat service 304 of FIG. 3A.

In various embodiments, the heartbeat messages may be transmitted from the UAV controller 204 to the flight management system 102, 300 (i.e. operating on computing device 108) using a User Datagram Protocol (UDP). To this end, and as explained herein, the heartbeat message may be compressed and encrypted before transmission over UDP.

Figure 15:
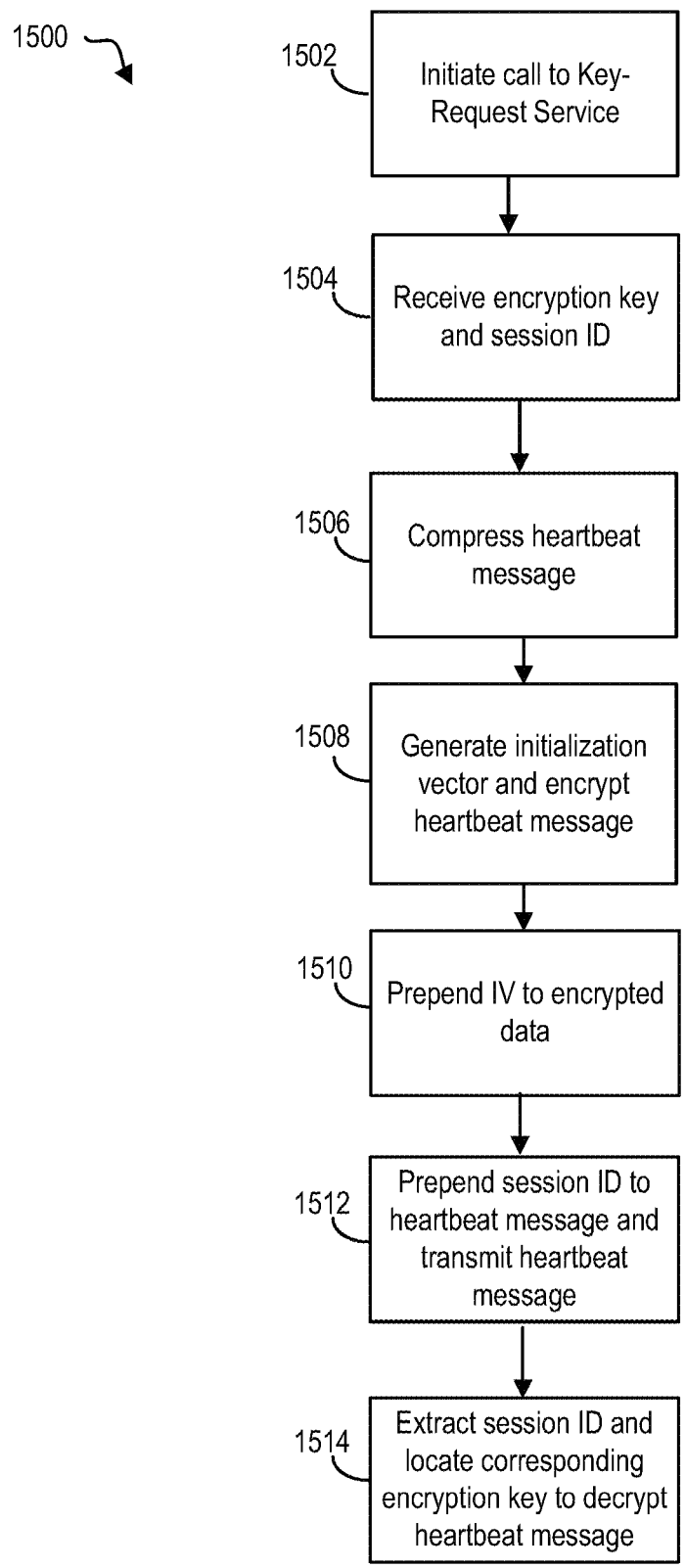
FIG. 15 is a process flow for a method for transmitting a heartbeat message, according to some embodiments.

Referring now to FIG. 15 is shown a process flow for a method 1500 for transmitting a heartbeat message, according to some embodiments.

At 1502, the UAV controller 204 will transmit a request to the flight management system 102 requesting a session ID and an encryption key. This request may be sent when the UAV is first powered-on.

At 1504, the key-request service 312, of the flight management system 102, receives the request and transmits back the session ID, the encryption key, as well as an address for the UAV to transmit heartbeat messages (i.e., the address may be a URL, IP and port address). In at least some embodiments, the encryption key is a unique 32-byte AES-256-encryption key. Further, in at least some cases, the key and the session ID may be configured to be valid for only one flight session, and may subsequently expire when the UAV is powered down. As such, a new session ID and key must be requested from the flight management system 102 with each power cycle. In various cases, the flight management system 102 stores the session ID and encryption key in order to associate, at a later point, these values with the particular UAV making the request.

At 1506, the UAV controller 204 receives the session ID and encryption key and proceeds to compress the heartbeat message. The compression may be performed, for example, using the compression module 204h. Compressing the heartbeat message may be important where the heartbeat message is transmitted over a satellite connection (i.e., which is conventionally low bandwidth and high latency). In at least some embodiments, the heartbeat message is compressed by a ratio of 50% or greater.

At 1508, a random initialization vector (IV) is generated by the UAV controller 204 and the compressed heartbeat message is AES-256 encrypted using the initialization vector. In at least some cases, the initialization vector is 16-bytes in length.

At 1510, the initialization vector is prepended to the encrypted message to allow the flight management system 102 to decrypt the heartbeat message.

At 1512, the session ID is prepended to the heartbeat message to allow the flight management system 102 to determine which UAV is transmitting the heartbeat message. The heartbeat message is then transmitted to the flight management system 102 over UDP using to the following format: [4 bytes, Session ID] [16 bytes, IV] [variable length, encrypted, compressed heartbeat data].

At 1514, the flight management system 102 receives the heartbeat message and extracts the session ID in order to identify which UAV is transmitting the message. Once the UAV is identified, the flight management system 102 identifies the corresponding encryption key and proceeds to decrypt the heartbeat message. In this manner, the session ID provides the identity for the UAV (or heartbeat message), and decryption of the heartbeat message allows for message authentication.

Once the message is decrypted, the flight management system 102 may proceed to decompress the message to retrieve its contents.

In at least some embodiments, heartbeat messages may be transmitted every five seconds from the UAV controller 204 to the flight management system 102. In various cases, however, the heartbeat period may be adjusted by a command transmitted by the flight management system 102 to the UAV controller 204 via a polling transaction.

Figure 10:
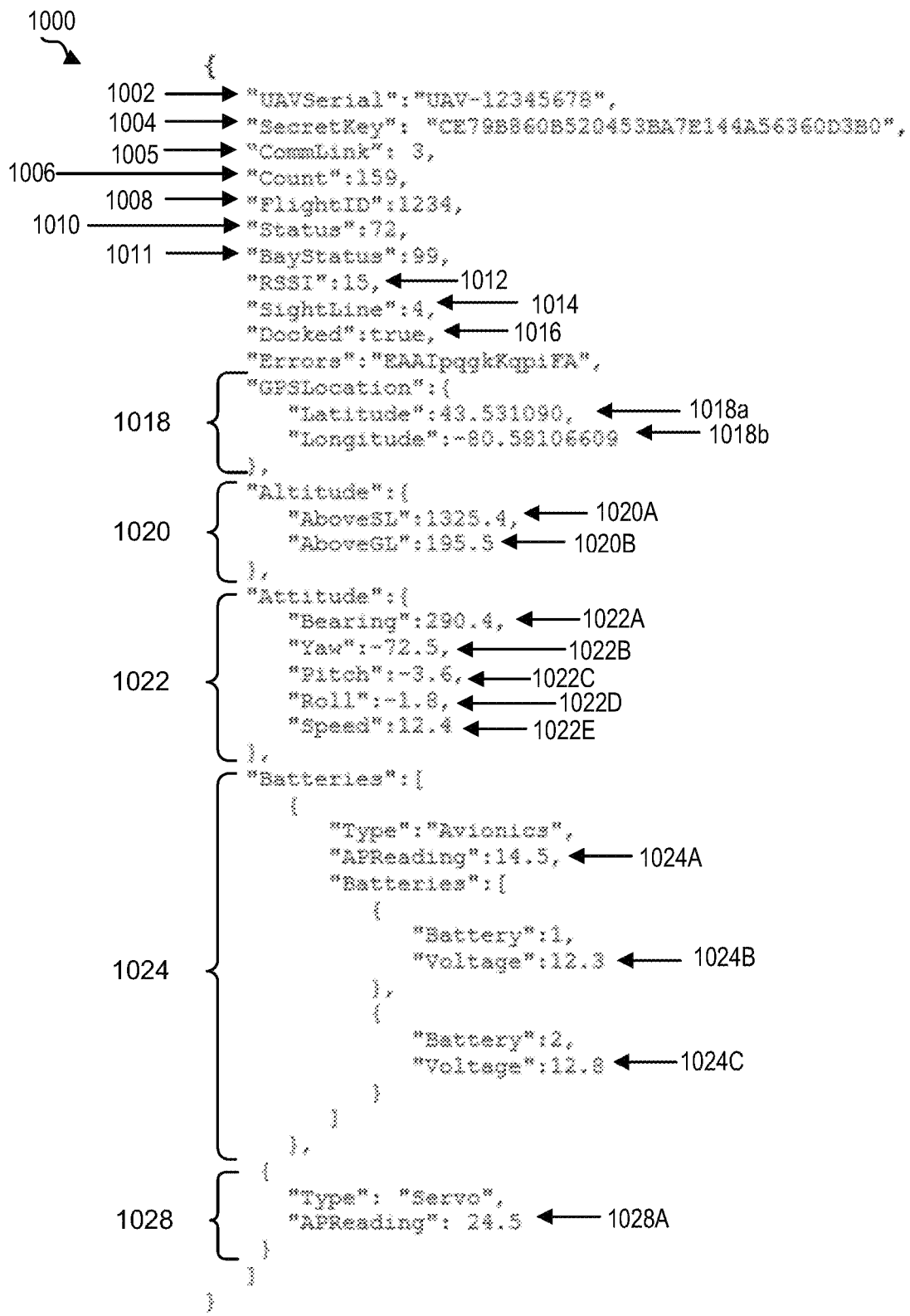
FIG. 10 is an example heartbeat message which may be transmitted by the UAV controller to the flight management system, according to some embodiments.

Referring now to FIG. 10, there is shown an example structure for a heartbeat message 1000 according to an example embodiment.

As shown, in at least some embodiments, the heartbeat message 1000 may be encoded using JavaScript Object Notation (JSON).

Further, as shown in FIG. 10, the heartbeat message 1000 may include a UAV serial number identifier 1002, as well as a clear text Message Authentication Code (MAC) 1004 (i.e. secret key). As previously discussed in relation to the polling/control service, the UAV serial number 1002 and MAC 1004 may allow the flight management system 102, 300 to authenticate the UAV controller 204 as a valid controller. In other embodiments, rather than including a serial number identifier 1002 and a MAC key 1004, the UAV identity is provided by the session ID and the authentication is provided by the encryption key generated by the key-request service 312 (i.e., as described in method 1500 of FIG. 15).

As further shown by FIG. 10, the heartbeat message 1000 may also include a communication link field 1005, a counter field 1006, a flight identification (ID) number field 1008, a status field 1010, a bay status field 1011, a received signal strength indicator (RSSI) field 1012, and a docked field 1016.

The communication link field 1005 is an integer which indicates the nature of available communication channels. For example, "00" may indicate no wireless channels available, "01" may indicate only satellite channels are available, "02" may indicate only cellular channels available", and "03" may indicate cellular and satellite channels are available. In at least some embodiments, the UAV will automatically connect to an ethernet connection where such a connection is made available.

The counter field 1006 is a number which may be increased by the UAV controller 204 each time a heartbeat message is sent to the flight management system 102. In various cases, the counter field 1006 may include a 16-bit overflow integer.

The flight ID field 1008 is a number which allows the flight management system 102 to identify heartbeats during the UAV's flight. The flight ID field 1008 is initially set by the flight management system 102 at the beginning of each flight session to a non-zero value. In some embodiments, the flight ID 1008 may be set by the flight management system 102 to a non-zero value using a polling transaction, as described above. The field ID field 1008 is then set to zero while the UAV is docked, undergoing maintenance, or at the end of the UAV's flight.

The status field 1010 allows the UAV controller 204 to transmit data with various pre-defined status indicators. By way of example, Table 3 below summarizes various statuses that may be expressed in the status field 1010:

TABLE 3

Examples Predefined Status IDs

| Status ID | Hex String | Status meaning |
| --- | --- | --- |
| 0 | 00 | Initializing (not ready for arming) |
| 16 | 10 | Initialized (Ready for arming) |
| 32 | 20 | Armed (Ready for Takeoff) |
| 104 | 68 | Taking off |
| 72 | 48 | On route |
| 74 | 4A | Landing |
| 20 | 14 | Landed (can take off - to return home) |
| 4 | 4 | Landed (can't take off - mission complete) |
| 1 | 1 | Fatal Error |
| 81 | 51 | Manual control - on ground |
| 82 | 52 | Manual control - in flight |
| 255 | FF | None of the above |

The bay status field 1011 is an integer which indicates the current status of the UAV doors. For example, in some cases, the UAV may have delivery bay doors (e.g., on the underside of the UAV) which are designed to open automatically when the UAV lands to drop a delivered package. The delivery bay doors will then close automatically when the UAV takes off to fly home. The bay status field 1011 indicates the status or desired action for the bay doors (e.g., open, closed, jammed, etc.). By way of example, Table 4 below summarizes various bay status field codes that may be used in the bay status field 1011:

TABLE 4

Examples Predefined Bay Status Field IDs

| Field Value | State | Description |
| --- | --- | --- |
| 0 or No Connection to Autopilot Program | Do not Open Door | The UAV has not yet reached a point in the mission when the door should be opened. |
| 1 | Ready to Open Door | The UAV has landed and is at a suitable point in the mission to release the payload. |
| 2 | Open Door | Command to the controller to open the door. |
| 3 | Door Opened | Response from the controller indicating the door is fully open based on feedback from the linear actuators. |
| 4 | Close Door | Command to the controller to open the door. |
| 5 | Door Closed | Response from the controller indicating the door is fully closed based on feedback from the linear actuators. |
| 11 | Error - Door Will not Open | Error Code - The door will not open. |
| 12 | Error - Door Will not Close | Error Code - The door will not close. |
| 13 | Error - Door Opened | Error Code - The door opened when it was not supposed to. |
| 14 | Override - Stay Closed | Ignore all commands to open the door |
| 15 | Override - Stay Open | Say you the door is stuck open but you want to fly home anyway |
| 99 | N/A | UAV does not have bay doors |

The RSSI field 1012 may be an integer value between 0 and 30 which indicates the received signal strength for signals received at the UAV controller 204 from the flight management system 102. The RSSI 1012 may be an integer 99 when an RSSI reading is unavailable.

A visual object tracker field 1014 may indicate if a visual object tracking system is sending data. In various cases, the visual object tracking system tracks "visual objects" located near or around the UAV. To this end, the tracking system may communicate with a camera (i.e., equipped onto the UAV) that identifies and tracks a "visual object". For example, the tracking system may track a visual marker at the landing spot for the UAV and the UAV may be precisely controlled to land at the visual marker. This feature is especially useful where the UAV is landing in a small space (e.g., 5 m×5 m), and where GPS coordinates are insufficiently accurate to position the UAV for landing. The visual tracking field may be an integer that is either zero (e.g., visual tracking is not active), or '4' (i.e., visual tracking is active). In FIG. 10, the visual object tracker field 1014 is labelled as "Sightline", which identifies the name of a proprietary commercial product that is specialized for visual object tracking.

The docked field 1016 is an integer field which indicates whether the UAV 200 is docked. In at least some embodiments, an integer value of '0' indicates that the UAV is not docked, and an integer value of '1' indicates the UAV is docked.

The heartbeat message 1000 can also include a plurality of locational and orientation data fields.

For example, in various cases, the heartbeat message 1000 can include a GPS location field 1018, a relative altitude field 1020, and an attitude field 1022.

The GPS location field 1018 includes the latitude position 1018a and longitude position 1018b of the UAV 200. In various cases, GPS information is provided by GPS module 202c of the autopilot 202. In at least some cases, the latitude and longitude positions may be expressed to an accuracy of six decimal points.

The relative altitude field 1020 indicates the altitude of the UAV above sea level 1020A, and above ground level 1020B. The relative altitude may be expressed up to an accuracy of one decimal point. In at least some cases, the values in the relative altitude field 1010 are expressed according to Equation (1):

$$\text{Relative Altitude above Sea Level, or Ground Level} = \text{GPS Altitude (Feet)}* -8 \quad (1)$$

The attitude field 1022 includes information in respect of the bearing 1022A, yaw 1022B, pitch 1022C, roll 1022D, and ground speed 1022E of the UAV 200. These measurements may be determined, for example, based on one or more sensor 206 on-board the UAV 200.

The bearing 1022A may be expressed in units of degrees between "0" and "360", where "0" indicates a northward bearing.

In at least some cases, each of yaw 1022B, pitch 1022C, and roll 1022D are expressed according to Equation (2):

$$\text{Yaw/Pitch/Roll} = \text{Degrees} * 17.87218 \quad (2)$$

Wherein the degrees may range from between "−180"* and "180"*.

The ground speed 1022E can be expressed in units of feet per second, and expressed according to Equation (3):

$$\text{Ground Speed} = \text{Feet/second} * 8 \quad (3)$$

The measurements in the attitude field 1022 can be expressed to an accuracy of one decimal point.

In at least some embodiments, the heartbeat message 1000 can also include information in respect of the status of various batteries and sensors located on-board UAV 200. In particular, the heartbeat message 1000 can include battery reading fields 1024 and 1028.

The battery reading fields 1024 and 1028 can include the statuses of various batteries mounted on-board the UAV 200.

For example, the battery status field 1024 can include information in respect of an avionics battery bank (e.g., which includes one or more batteries, such as battery 208 of FIG. 2), while battery status field 1028 can include information in respect of a servo battery bank.

In various cases, each of the one or more battery reading fields can include voltage readings 1024A, 1024B, 1034C, and 1028A, of each battery in the battery bank The voltages may be expressed in units of Volts, and in various cases, to a precision of one decimal point.

In other cases, the heartbeat message 1000 may also include a sensor status field which includes information in respect of the various sensors located on the UAV 200.

(d) Short Message Service (SMS) Service:

The message service, or the SMS web-service, allows the flight management system 102 to communicate with the UAV controller 204 using short message service (SMS).

In at least some embodiments, the SMS service can be used as an alternative to polling transactions (i.e., in the polling/control service) to allow the flight management system 102 to transmit commands, and information request messages, to the UAV controller 204.

In particular, in an SMS transaction the flight management system 102 can transmit instructions to the UAV controller 204 without waiting to be first polled.

The SMS service can be used where the network 106 of FIG. 1 includes, for example, a cellular or a satellite network. The identity of any particular UAV, i.e. UAVs 104a to 104c, may be based on a cell modem SIM, located for example, in the communication module 204b as shown in FIG. 2C. To this end, an SMS gateway may be used to facilitate exchange of SMS messages between the UAV controller 204 and the flight management system 102. The SMS gateway includes the SIM for a particular UAV modem and forwards the message to the corresponding UAV modem.

In various embodiments, SMS message between UAVs and the flight management system may use the same message formats 400A of FIG. 4A and 400B of FIG. 4B, as those used in the polling transactions. A secret key method is still used to authenticate messages from the UAV controller 204.

Figure 13:
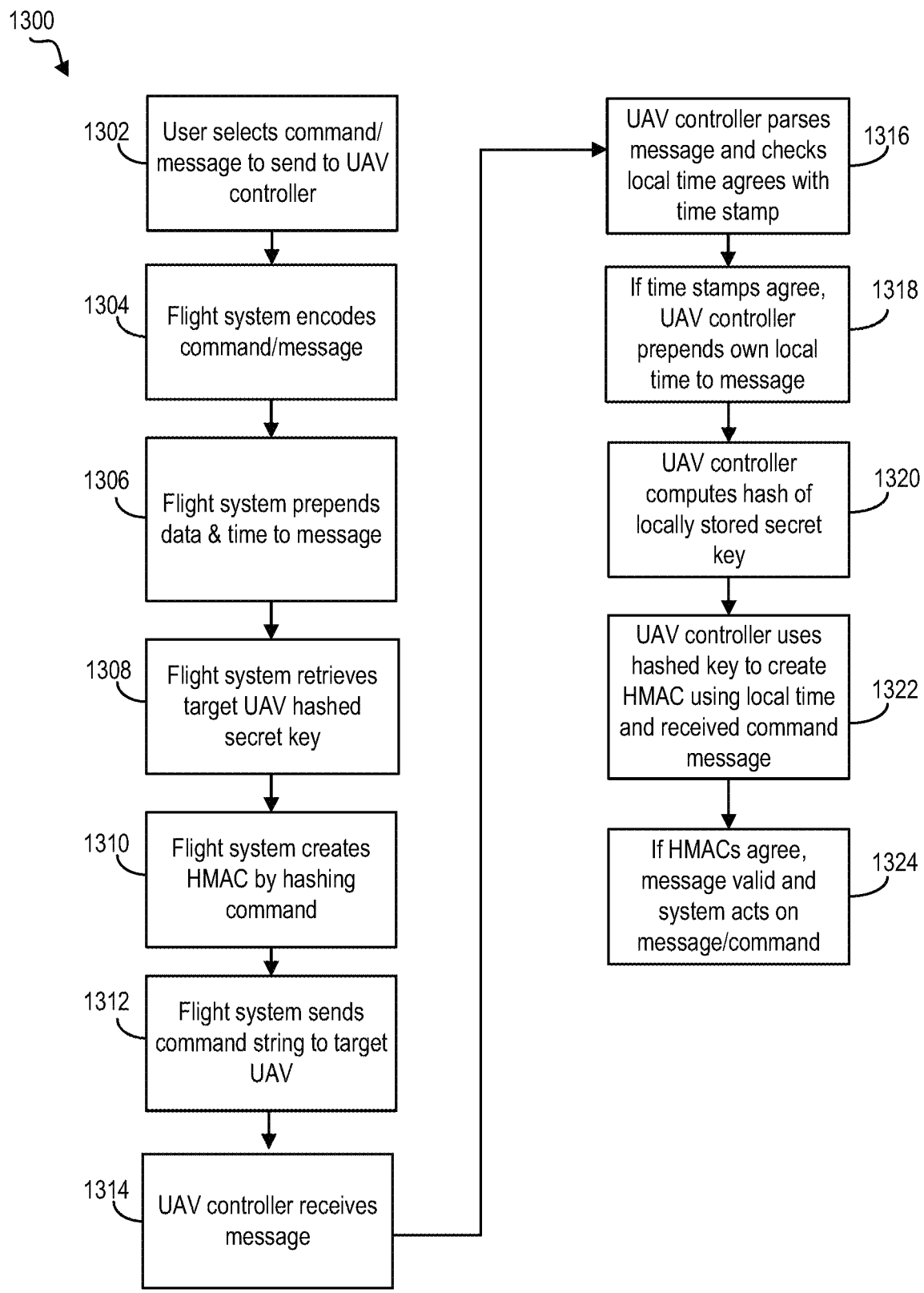
FIG. 13 is a process flow for an example method for short message service (SMS) communication between the flight management system and the UAV controller.

Referring now to FIG. 13, there is shown a process flow for an example method 1300 for SMS communication between the flight management system 102 and the UAV controller 204.

At 1302, a user of the computing device 108 may select a command or message to be sent to the UAV controller 204. At 1304, the flight management system 102 may encode the command or message according to, for example, message structure 400A of FIG. 4A. At 1306, the flight management system 102 may prepend a date and time stamp to the message.

At 1308, the flight management system 102 may retrieve the target UAV's hashed secret key. For example, the flight management system 102 may retrieve the hashed secret key from an internal database located on the memory 108b of computer 108.

At 1310, the flight management system 102 may then create a keyed-hash message authentication code (HMAC) code of the date, time and command (i.e., the message generated at 1306) using the UAV's hashed secret key as the HMAC secret key. The HMAC secret key may then add the HMAC secret key to the encoded message at 1306, as follows:

Date/Time|Message 400A|HMAC

At 1312, the flight management system 102 may transmit the encoded message to the target UAV. At 1314, the UAV controller 204 receives the message. At 1316 the UAV controller may parse the message to ensure that the local time agrees with the time stamp. At 1318, if the time stamps agree, the UAV controller 204 may then prepend its own local time to the message. At 1320, the UAV controller 204 may compute the hash of a locally stored secret key. At 1332, the UAV controller 204 uses the hashed key from 1320 to create an HMAC using the local date and time stamp, and received command message (i.e. similar to 1310). If the HMAC hash generated by the UAV controller 204 at 1322 matches the HMAC located in the encoded message at 1314, the SMS message is considered valid. Otherwise the message is dropped.

The present invention has been described here by way of example only, while numerous specific details are set forth herein in order to provide a thorough understanding of the exemplary embodiments described herein. However, it will be understood by those of ordinary skill in the art these embodiments may, in some cases, be practiced without these specific details. In other instances, well-known methods, procedures and components have not been described in detail so as not to obscure the description of the embodiments. Various modifications and variations may be made to these exemplary embodiments without departing from the spirit and scope of the invention, which is limited only by the appended claims.

The invention claimed is:

1. A method for secure communication with one or more unmanned aerial vehicles, the method comprising:
    receiving, by at least one computing system located at a flight management system, over a communication network, from a controller located at an unmanned aerial vehicle (UAV) of the one or more unmanned vehicles, a message generated by the controller of the UAV;
    extracting, by the at least one computing system, from the message, an unmanned aerial vehicle serial number and a secret key;
    computing, at the at least one computing system, a hash of the secret key to generate a first hashed secret key;
    retrieving, from an internal database located at the flight management system, a second hashed secret key associated with the unmanned aerial vehicle serial number;
    comparing the first hashed secret key with the second hashed secret key, wherein the message is determined to be valid if the first hashed secret key agrees with the second hashed secret key.

2. The method of claim 1, further comprising:
    after determining the message to be valid, transmitting, by the at least one computing system, to the controller of the UAV, a first response poll message, wherein the first response poll message comprises one of a command message, an information request message and an acknowledgement message.

3. The method of claim 1, wherein the message is a hypertext transfer protocol (HTTP) POST message, which is transmitted over an HTTP secure channel.

4. The method of claim 1, wherein the message is a polling request configured to initiate communication between the UAV and the at least one computing system.

5. The method of claim 2, wherein when the first response poll message is a command message, the first response poll message comprises:
    a payload field defined by an encoded command; and
    a hash field defined by a first hash of the encoded command.

6. The method of claim 5, wherein after transmitting the first response poll message, the method further comprises:
    receiving, by the at least one computing system, a second response poll message indicating whether the first hash agrees with a second hash, wherein the second hash of the encoded command in the payload field is generated by the controller of the UAV, and the second hash is compared with the first hash of the encoded command at the controller.

7. The method of claim 5, wherein the encoded command includes a command for one of loading UAV route data and modifying UAV route data.

8. The method of claim 2, wherein the first response poll message is an information request message, and wherein after transmitting the first response poll message, the method further comprises:
    receiving, by the at least one computing system, a second response poll message, the second response poll message being generated by the controller of the UAV and comprising the requested information.

9. The method of claim 1, wherein the message comprises an alert message, and wherein the alert message indicates at least one of a failed command execution by an autopilot and a status change in the autopilot, wherein the autopilot is in data communication with the controller, and the autopilot is also located on the UAV and configured to control the UAV.

10. The method of claim 9, wherein the message comprises a heartbeat message, wherein the heartbeat message includes information retrieved from at least one of the autopilot and the controller.

11. The method of claim 1, wherein the message is a short message service (SMS) message.

12. The method of claim 1, wherein the hashing employs an SHA256 hash method.

13. A method for secure communication with one or more unmanned aerial vehicles, the method comprising:
    transmitting, by a controller located on an unmanned aerial vehicle (UAV) of the one or more unmanned aerial vehicles, to a flight management system, over a communication network, a poll request message; and
    receiving, by the controller, from the flight management system, a response message comprising at least one of an information request message, a command message or an acknowledgement message,
    wherein when the response message comprises the command message, the method further comprises:
    receiving, by the controller, from the flight management system, over the communication network, the command message comprising a first authentication code, the first authentication code being generated at the flight management system and being based on a command to be executed by the controller of the UAV, a date and time stamp prepended to the command and a first hashed secret key corresponding to the UAV, the first hashed secret key being locally stored at the flight management system;

processing, by the controller, the command message to determine if local time agrees with the time stamp corresponding to the command message;

if so, processing, by the controller, the command message to prepend the local time to the command message;

computing, by the controller, hash of a secret key corresponding to the UAV to generate a second hashed secret key;

generating, by the controller, a second authentication code based on the second hashed secret key, local date and time stamp and the command message;

determining, by the controller, if the first authentication code agrees with the second authentication code;

if the first authentication code agrees with the second authentication code, executing the command included in the command message by the controller of the UAV.

14. The method of claim 13, further comprising:

transmitting, by the controller, to the flight management system, over the communication network, a key request message;

receiving from the flight management system, at the controller, an encryption key and a session identification number;

using the encryption key, encrypting at the controller a heartbeat message to generate an encrypted heartbeat message;

attaching at the controller the session identification number to the encrypted heartbeat message; and transmitting, from the controller, the encrypted heartbeat message to the flight management system.

15. The method of claim 14, further comprising: compressing, by the controller, the heartbeat message before transmitting.

16. The method of claim 14, wherein the heartbeat message comprises status information of the UAV.

17. The method of claim 14, wherein the heartbeat message comprises location information of the UAV.

18. The method of claim 14, wherein the encryption key is an AES-256-encryption key.

19. The method of claim 14, further comprising:

generating, by the controller, an initialization vector; and attaching, by the controller, the initialization vector to the encrypted heartbeat message.

* * * * *